(12) United States Patent
Zhang et al.

(10) Patent No.: US 12,441,027 B2
(45) Date of Patent: Oct. 14, 2025

(54) VIBRATION DEVICE FOR MIXING MACHINE

(71) Applicant: XUCHANG DETONG VIBRATORY MIXING TECHNOLOGY CO. LTD, Henan (CN)

(72) Inventors: Liangqi Zhang, Xuchang (CN); Guanfeng Li, Xuchang (CN); Xianning Kong, Xuchang (CN)

(73) Assignee: XUCHANG DETONG VIBRATORY MIXING TECHNOLOGY CO. LTD, Henan (CN)

( * ) Notice: Subject to any disclaimer, the term of this patent is extended or adjusted under 35 U.S.C. 154(b) by 1076 days.

(21) Appl. No.: 17/298,020

(22) PCT Filed: Dec. 20, 2019

(86) PCT No.: PCT/CN2019/126841
§ 371 (c)(1),
(2) Date: May 27, 2021

(87) PCT Pub. No.: WO2020/155916
PCT Pub. Date: Aug. 6, 2020

(65) Prior Publication Data
US 2022/0088826 A1 Mar. 24, 2022

(30) Foreign Application Priority Data
Jan. 28, 2019 (CN) .......................... 201910081504.3

(51) Int. Cl.
*B28C 5/48* (2006.01)
*B28C 5/14* (2006.01)

(52) U.S. Cl.
CPC . *B28C 5/48* (2013.01); *B28C 5/14* (2013.01)

(58) Field of Classification Search
CPC ........ B01F 31/44; B01F 31/40; B01F 31/401; B01F 31/42; B28C 5/14; B28C 5/48
See application file for complete search history.

(56) References Cited

U.S. PATENT DOCUMENTS 3,947,167 A * 3/1976 Rochfort ................. B28B 13/02
425/456
4,191,031 A * 3/1980 Girguis ................. F16D 3/2265
464/145
(Continued)

FOREIGN PATENT DOCUMENTS

CN 207273568 U 4/2018
CN 108032433 A 5/2018
(Continued)

OTHER PUBLICATIONS

Machine translation of CN208148174, accessed via worldwide.espacenet.com on Jul. 17, 2024 (Year: 2018).*
(Continued)

*Primary Examiner* — Marc C Howell
(74) *Attorney, Agent, or Firm* — Clark Hill PLC

(57) ABSTRACT

Vibration devices for a mixing machine are disclosed, including, for example, a vibration transmission device, a transmission shaft, first bearing(s), a first bearing seat, second bearing(s), a second bearing seat, and a mixing shaft. In some embodiments, the transmission shaft may pass through the first bearing seat, and may be supported in the first bearing seat via at least two bearings. Further, one end of the transmission shaft may be connected to the vibration transmission device, and the other end of the transmission shaft may be connected in a fixed manner to the second bearing seat. In addition, the second bearing seat may be connected to a shaft head at one end of the mixing shaft via the second bearing, and, in some implementations, the (Continued)

rotational center line of the transmission shaft may be arranged so as to be offset from an outer axis of the second bearing.

20 Claims, 25 Drawing Sheets

(56) References Cited

U.S. PATENT DOCUMENTS

| | | | |
|---|---|---|---|
| 4,758,095 A | | 7/1988 | Kanda et al. |
| 2016/0159145 A1* | | 6/2016 | Nagata ............... B60B 27/0026 29/898.07 |

FOREIGN PATENT DOCUMENTS

| | | |
|---|---|---|
| CN | 207290524 U | 5/2018 |
| CN | 108407082 A | 8/2018 |
| CN | 207789312 U | 8/2018 |
| CN | 207920866 U | 9/2018 |
| CN | 207930866 U | 10/2018 |
| CN | 208148174 U | 11/2018 |
| CN | 109591190 A | 4/2019 |
| CN | 109910175 A | 6/2019 |
| CN | 209718212 U | 12/2019 |
| CN | 209954988 U | 1/2020 |
| CN | 209971121 U | 1/2020 |
| CN | 209971122 U | 1/2020 |
| CN | 209971123 U | 2/2020 |
| CN | 210061590 U | 2/2020 |
| CN | 210100363 U | 2/2020 |
| IN | 207921131 U | 9/2018 |
| IN | 209971124 U | 2/2020 |
| WO | 2013067864 A1 | 5/2013 |

OTHER PUBLICATIONS

International Search Report mailed Mar. 17, 2020 in International Application No. PCT/CN2019/126841, and English-language translation of same, 8 pages.
Written Opinion mailed Mar. 17, 2020 in International Application No. PCT/CN2019/126841, 4 pages.
1st Office Action dated Dec. 5, 2023, in counterpart Chinese patent application No. CN2019100815043, and Global Dossier/machine translation of same; 12 pages total.
2nd Office Action dated Mar. 15, 2024, in counterpart Chinese patent application No. CN2019100815043, and Global Dossier/machine translation of same; 10 pages total.
3rd Office Action dated May 16, 2024, in counterpart Chinese patent application No. CN2019100815043; 4 pages total.
First Search Report dated Dec. 5, 2023, in counterpart Chinese patent application No. CN2019100815043; 2 pages.
Supplemental Search Report dated Mar. 15, 2024, in counterpart Chinese patent application No. CN2019100815043; 1 page.
Bangchun, Wen, Modern Vibration Screening Technology and Equipment Design, published Oct. 31, 2013, Metallurgical Industry Press (NPL Article cited in Supplemental Chinese Search Report dated Mar. 15, 2024); 5 pages.

* cited by examiner

VIBRATION DEVICE FOR MIXING MACHINE

CROSS REFERENCE TO RELATED APPLICATION(S) INFORMATION

The present application is a U.S. national stage patent application, pursuant to 35 U.S.C. § 371, of PCT International Application No.: PCT/CN2019/126841, filed Dec. 20, 2019, published as WO2020/155916A1, which claims priority to Chinese patent application No. 201910081504.3, filed Jan. 28, 2019, the contents of all of which are hereby incorporated by reference, and by submission herewith, in their entirety.

TECHNICAL FIELD

The present disclosure pertains to the technical field of mixing machines and in particular relates to a vibration device for a mixing machine.

BACKGROUND ART

A mixing machine is a machine that can mix and blend multiple raw materials into a specific mixture. Mixing machines may be divided into two categories, i.e., compulsory mixing machines and gravity mixing machines, according to the mixing modes. The compulsory mixing machines are popular with customers and have become the currently prevalent mixing equipment in China and abroad because of their characteristics of good mixing quality and high mixing efficiency. As users have increasingly higher requirements for mixing quality and new materials, especially materials that are less easily mixed, are increasingly emerging, higher requirements are placed on the technical performance and reliability of conventional mixing equipment. Taking cement/concrete mixing machines as an example, conventional compulsory mixing machines involve "static mixing" and generally have problems such as high consumption of energy and raw materials, uneven mixing of concrete in a microscopic view, and poor adaptability to materials. If the cement slurry in the macroscopically uniformly mixed concrete is observed under a microscope, "agglomeration" phenomenon of 10% to 20% of cement particles is still observed in the microscopic view, which affects the quality of mixing of concrete and the durability of concrete members.

The vibrational mixing technology has been recognized both in China and abroad as one of the most economical methods to improve the mixing quality and efficiency. From the 1930s to the present day, the research results from domestic and foreign scholars have shown that vibrational mixing allows for an increased speed of movement of particles in blended materials, an increased number of effective collisions, an effective reduction of the "agglomeration" phenomenon of cement particles, a significant enhancement of the bonding strength at an interface between the aggregate and the set cement, an improvement of the weakest part in the concrete, an increased strength of the concrete, an improved microstructure of the concrete, and an extended durability of concrete members. Vibration devices are the core of vibrational mixing equipment, there is still room for further improvement of the vibration devices of the prior art vibrational mixing machines in terms of, for example, structure, vibration effect, and reliability, because the vibrational mixing technology is industrially developed late, while there are more types of materials to be blended and higher requirements are placed on the mixing quality.

SUMMARY

An object of the present disclosure is to provide a vibration device with a simpler structure, a better vibration effect, and higher reliability, in order to solve the general problems of the vibration devices of the prior art vibrational mixing machines which need to be further improved in terms of, for example, structure, vibration effect, and reliability.

The following technical solutions are employed in the present disclosure.

A vibration device for a mixing machine includes a vibration transmission device, a transmission shaft, first bearings, a first bearing housing, a second bearing, a second bearing housing, and a mixing shaft. The transmission shaft is arranged so as to pass through the first bearing housing and supported in the first bearing housing through the at least two first bearings. One end of the transmission shaft is connected to the vibration transmission device, and the other end of the transmission shaft is fixedly connected to the second bearing housing. The second bearing housing is connected to a shaft head at one end of the mixing shaft by means of the second bearing. A rotational centerline of the transmission shaft is arranged so as to be offset from an axis of an outer raceway of the second bearing. The axis of the outer raceway of the second bearing refers to a centerline of the outer raceway of the second bearing along the axial direction of the transmission shaft.

Further, the transmission shaft and the second bearing housing are fitted with each other by means of seam allowances. The inner surface or outer surface of the seam allowance may be a non-circular surface, and it is preferable that the transmission shaft has an end portion formed as a convex (or male) seam allowance, and the second bearing housing has an end portion formed as a concave (or female) seam allowance. After assembly, the rotational centerline of the transmission shaft is arranged so as to be offset from the axis of the outer raceway of the second bearing. It is also possible that the transmission shaft has an end portion formed as a concave seam allowance, and the second bearing housing has an end portion formed as a convex seam allowance.

Further, the transmission shaft and the second bearing housing are fitted with each other by means of seam allowances and then welded to each other. It is preferable that the outer cylindrical surface of the convex seam allowance of the transmission shaft has a centerline arranged eccentrically relative to the rotational centerline of the transmission shaft. As mentioned above, the seam allowances for fitting the transmission shaft and the second bearing housing with each other may be reversed with each other, which will not be described in detail here.

Further, the transmission shaft and the second bearing housing are fitted with each other by means of seam allowances. It is preferable that the inner hole of the concave seam allowance of the second bearing housing is arranged eccentrically relative to the outer cylindrical surface of the second bearing housing. After assembly, the rotational centerline of the transmission shaft is arranged so as to be offset from the axis of the outer raceway of the second bearing. As mentioned above, the seam allowances for fitting the transmission shaft and the second bearing housing with each other may be reversed with each other, which will not be described in detail here.

Further, the transmission shaft and the second bearing housing are fitted with each other by means of seam allowances. It is preferable that the outer cylindrical surface of the convex seam allowance of the transmission shaft has a centerline arranged eccentrically relative to the rotational centerline of the transmission shaft, and the inner hole of the concave seam allowance of the second bearing housing is arranged eccentrically relative to the outer cylindrical surface of the second bearing housing. After assembly, the rotational centerline of the transmission shaft is arranged so as to be offset from the axis of the outer raceway of the second bearing. As mentioned above, the seam allowances for fitting the transmission shaft and the second bearing housing with each other may be reversed with each other, which will not be described in detail here.

Further, the transmission shaft and the second bearing housing are fitted with each other by means of seam allowances. It is preferable that the outer cylindrical surface of the convex seam allowance of the transmission shaft has a centerline arranged eccentrically relative to the rotational centerline of the transmission shaft, and an inner hole of the second bearing housing in which the second bearing is mounted has a centerline arranged eccentrically relative to the rotational centerline of the transmission shaft. As mentioned above, the seam allowances for fitting the transmission shaft and the second bearing housing with each other may be reversed with each other, which will not be described in detail here.

Further, the transmission shaft and the second bearing housing are fitted with each other by means of seam allowances. It is preferable that the inner hole of the concave seam allowance of the second bearing housing is arranged eccentrically relative to the outer cylindrical surface of the second bearing housing, and the inner hole of the second bearing housing in which the second bearing is mounted has a centerline arranged eccentrically relative to the rotational centerline of the transmission shaft. As mentioned above, the seam allowances for fitting the transmission shaft and the second bearing housing with each other may be reversed with each other, which will not be described in detail here.

Further, the transmission shaft and the second bearing housing are fitted with each other by means of seam allowances. An eccentric sleeve is arranged between the second bearing housing and the outer ring of the second bearing. The eccentric sleeve may be a component such as a sleeve with multiple shaft segments. It is preferable that the outer cylindrical surface of the convex seam allowance of the transmission shaft has a centerline arranged eccentrically relative to the rotational centerline of the transmission shaft, and it is preferable that an inner hole of the eccentric sleeve with a single shaft segment in which the second bearing is mounted has a centerline arranged eccentrically relative to the rotational centerline of the transmission shaft, and the inner hole of the second bearing housing in which the second bearing is mounted has a centerline arranged eccentrically relative to the rotational centerline of the transmission shaft. As mentioned above, the seam allowances for fitting the transmission shaft and the second bearing housing with each other may be reversed with each other, which will not be described in detail here.

Further, the transmission shaft and the second bearing housing are fitted with each other by means of seam allowances. An eccentric sleeve is arranged between the second bearing housing and the outer ring of the second bearing. The eccentric sleeve may be a component such as a sleeve with multiple shaft segments. It is preferable that the inner hole of the concave seam allowance of the second bearing housing is arranged eccentrically relative to the outer cylindrical surface of the second bearing housing, and it is preferable that an inner hole of the eccentric sleeve with a single shaft segment in which the second bearing is mounted has a centerline arranged eccentrically relative to the rotational centerline of the transmission shaft. As mentioned above, the seam allowances for fitting the transmission shaft and the second bearing housing with each other may be reversed with each other, which will not be described in detail here.

Further, the transmission shaft and the second bearing housing are fitted with each other by means of seam allowances. It is preferable that the outer cylindrical surface of the convex seam allowance of the transmission shaft has a centerline arranged eccentrically relative to the rotational centerline of the transmission shaft, and the second bearing is a bearing with an eccentric outer ring. The bearing with an eccentric outer ring refers to a bearing comprising an outer ring having an outer cylindrical surface with a centerline eccentric to an axis of an outer raceway. The axis of the outer raceway refers to a centerline of the outer raceway along the axial direction of the transmission shaft. As mentioned above, the seam allowances for fitting the transmission shaft and the second bearing housing with each other may be reversed with each other, which will not be described in detail here.

Further, the transmission shaft and the second bearing housing are fitted with each other by means of seam allowances. It is preferable that the inner hole of the concave seam allowance of the second bearing housing is arranged eccentrically relative to the outer cylindrical surface of the second bearing housing, and the second bearing is a bearing with an eccentric outer ring. As mentioned above, the seam allowances for fitting the transmission shaft and the second bearing housing with each other may be reversed with each other, which will not be described in detail here.

Further, a flange is arranged between the transmission shaft and the second bearing housing. The flange has two ends fitted with the transmission shaft and the second bearing housing by means of seam allowances, respectively, and it is preferable that a concave seam allowance is provided on a side of the flange close to the transmission shaft, and a corresponding end portion of the transmission shaft is formed as a convex seam allowance. The flange and the transmission shaft are fitted by means of the seam allowances and then welded to each other. Preferably, a convex seam allowance is provided on a side of the flange close to the second bearing housing, and a corresponding end of the second bearing housing is formed as a concave seam allowance. The flange and the second bearing housing are fitted by means of the seam allowances and then connected by bolts. As mentioned above, the fitting seam allowances on the two sides of the flange may be reversed with each other, which will not be described in detail here.

Further, a flange is arranged between the transmission shaft and the second bearing housing. Preferably, the outer cylindrical surface of the convex seam allowance of the transmission shaft has a centerline arranged eccentrically relative to the rotational centerline of the transmission shaft. As mentioned above, the fitting seam allowances of the flange and the transmission shaft may be reversed with each other, which will not be described in detail here.

Further, a flange is arranged between the transmission shaft and the second bearing housing. Preferably, the inner hole of the concave seam allowance of the flange is arranged eccentrically relative to the outer cylindrical surface of the flange. After assembly, the rotational centerline of the transmission shaft is arranged so as to be offset from the axis of the outer raceway of the second bearing. As mentioned above, the fitting seam allowances of the flange and the transmission shaft may be reversed with each other, which will not be described in detail here.

Further, a flange is arranged between the transmission shaft and the second bearing housing. Preferably, the outer cylindrical surface of the convex seam allowance of the flange has a centerline arranged eccentrically relative to the rotational centerline of the transmission shaft. As mentioned above, the fitting seam allowances of the flange and the second bearing housing may be reversed with each other, which will not be described in detail here.

Further, a flange is arranged between the transmission shaft and the second bearing housing. Preferably, the inner hole of the concave seam allowance of the second bearing housing is arranged eccentrically relative to the outer cylindrical surface of the second bearing housing. After assembly, the rotational centerline of the transmission shaft is arranged so as to be offset from the axis of the outer raceway of the second bearing. As mentioned above, the fitting seam allowances of the flange and the second bearing housing may be reversed with each other, which will not be described in detail here.

Further, a flange is arranged between the transmission shaft and the second bearing housing. Preferably, the outer cylindrical surface of the convex seam allowance of the transmission shaft has a centerline arranged eccentrically relative to the rotational centerline of the transmission shaft, and the inner hole of the concave seam allowance of the flange is arranged eccentrically relative to the outer cylindrical surface of the flange. As mentioned above, the fitting seam allowances of the flange and the transmission shaft may be reversed, which will not be described in detail here.

Further, a flange is arranged between the transmission shaft and the second bearing housing. Preferably, the outer cylindrical surface of the convex seam allowance of the transmission shaft has a centerline arranged eccentrically relative to the rotational centerline of the transmission shaft, and the outer cylindrical surface of the convex seam allowance of the flange has a centerline arranged eccentrically relative to the rotational centerline of the transmission shaft. As mentioned above, the fitting seam allowances at both ends of the flange may be reversed, which will not be described in detail here.

Further, a flange is arranged between the transmission shaft and the second bearing housing. Preferably, the outer cylindrical surface of the convex seam allowance of the transmission shaft has a centerline arranged eccentrically relative to the rotational centerline of the transmission shaft, and the inner hole of the concave seam allowance of the second bearing housing is arranged eccentrically relative to the outer cylindrical surface of the second bearing housing. As mentioned above, the fitting seam allowances at both ends of the flange may be reversed, which will not be described in detail here.

Further, a flange is arranged between the transmission shaft and the second bearing housing. Preferably, the outer cylindrical surface of the convex seam allowance of the transmission shaft has a centerline arranged eccentrically relative to the rotational centerline of the transmission shaft, and the inner hole of the second bearing housing in which the second bearing is mounted has a centerline arranged eccentrically relative to the rotational centerline of the transmission shaft. As mentioned above, the fitting seam allowances of the flange and the transmission shaft may be reversed, which will not be described in detail here.

Further, a flange is arranged between the transmission shaft and the second bearing housing. Preferably, an eccentric sleeve is arranged between the second bearing housing and the outer ring of the second bearing. The eccentric sleeve may be a component such as a sleeve with multiple shaft segments. It is preferable that the outer cylindrical surface of the convex seam allowance of the transmission shaft has a centerline arranged eccentrically relative to the rotational centerline of the transmission shaft, and it is preferable that an inner hole of the eccentric sleeve with a single shaft segment in which the second bearing is mounted has a centerline arranged eccentrically relative to the rotational centerline of the transmission shaft. As mentioned above, the fitting seam allowances of the flange and the transmission shaft may be reversed, which will not be described in detail here.

Further, a flange is arranged between the transmission shaft and the second bearing housing. Preferably, the outer cylindrical surface of the convex seam allowance of the transmission shaft has a centerline arranged eccentrically relative to the rotational centerline of the transmission shaft, and the second bearing is a bearing with an eccentric outer ring. As mentioned above, the fitting seam allowances of the flange and the transmission shaft may be reversed, which will not be described in detail here.

Further, a flange is arranged between the transmission shaft and the second bearing housing. Preferably, the inner hole of the concave seam allowance of the flange is arranged eccentrically relative to the outer cylindrical surface of the flange, and the outer cylindrical surface of the convex seam allowance of the flange has a centerline arranged eccentrically relative to the rotational centerline of the transmission shaft. As mentioned above, the fitting seam allowances on the two sides of the flange may be reversed, which will not be described in detail here.

Further, a flange is arranged between the transmission shaft and the second bearing housing. Preferably, the inner hole of the concave seam allowance of the flange is arranged eccentrically relative to the outer cylindrical surface of the flange, and the inner hole of the concave seam allowance of the second bearing housing is arranged eccentrically relative to the outer cylindrical surface of the second bearing housing. As mentioned above, the fitting seam allowances on the two sides of the flange may be reversed, which will not be described in detail here.

Further, a flange is arranged between the transmission shaft and the second bearing housing. Preferably, the inner hole of the concave seam allowance of the flange is arranged eccentrically relative to the outer cylindrical surface of the flange, and the inner hole of the second bearing housing in which the second bearing is mounted has a centerline arranged eccentrically relative to the rotational centerline of the transmission shaft. As mentioned above, the fitting seam allowances of the flange and the transmission shaft may be reversed, which will not be described in detail here.

Further, a flange is arranged between the transmission shaft and the second bearing housing. An eccentric sleeve is arranged between the second bearing housing and the outer ring of the second bearing. The eccentric sleeve may be a component such as a sleeve with multiple shaft segments. It is preferable that the inner hole of the concave seam allowance of the flange is arranged eccentrically relative to the outer cylindrical surface of the flange, and it is preferable that an inner hole of the eccentric sleeve with a single shaft segment in which the second bearing is mounted has a centerline arranged eccentrically relative to the rotational centerline of the transmission shaft. As mentioned above, the fitting seam allowances of the flange and the transmission shaft may be reversed, which will not be described in detail here.

Further, a flange is arranged between the transmission shaft and the second bearing housing. Preferably, the inner hole of the concave seam allowance of the flange is arranged eccentrically relative to the outer cylindrical surface of the flange, and the second bearing is a bearing with an eccentric outer ring. As mentioned above, the fitting seam allowances of the flange and the transmission shaft may be reversed, which will not be described in detail here.

Further, a flange is arranged between the transmission shaft and the second bearing housing. Preferably, the outer cylindrical surface of the convex seam allowance of the flange has a centerline arranged eccentrically relative to the rotational centerline of the transmission shaft, and the inner hole of the concave seam allowance of the second bearing housing is arranged eccentrically relative to the outer cylindrical surface of the second bearing housing. As mentioned above, the fitting seam allowances of the flange and the second bearing housing may be reversed, which will not be described in detail here.

Further, a flange is arranged between the transmission shaft and the second bearing housing. Preferably, the outer cylindrical surface of the convex seam allowance of the flange has a centerline arranged eccentrically relative to the rotational centerline of the transmission shaft, and the inner hole of the second bearing housing in which the second bearing is mounted has a centerline arranged eccentrically relative to the rotational centerline of the transmission shaft. As mentioned above, the fitting seam allowances of the flange and the second bearing housing may be reversed, which will not be described in detail here.

Further, a flange is arranged between the transmission shaft and the second bearing housing. An eccentric sleeve is arranged between the second bearing housing and the outer ring of the second bearing. The eccentric sleeve may be a component such as a sleeve with multiple shaft segments. It is preferable that the outer cylindrical surface of the convex seam allowance of the flange has a centerline arranged eccentrically relative to the rotational centerline of the transmission shaft, and it is preferable that an inner hole of the eccentric sleeve with a single shaft segment in which the second bearing is mounted has a centerline arranged eccentrically relative to the rotational centerline of the transmission shaft. As mentioned above, the fitting seam allowances of the flange and the second bearing housing may be reversed, which will not be described in detail here.

Further, a flange is arranged between the transmission shaft and the second bearing housing. Preferably, the outer cylindrical surface of the convex seam allowance of the flange has a centerline arranged eccentrically relative to the rotational centerline of the transmission shaft, and the second bearing is a bearing with an eccentric outer ring. As mentioned above, the fitting seam allowances of the flange and the second bearing housing may be reversed, which will not be described in detail here.

Further, a flange is arranged between the transmission shaft and the second bearing housing. Preferably, the inner hole of the concave seam allowance of the second bearing housing is arranged eccentrically relative to the outer cylindrical surface of the second bearing housing, and the inner hole of the second bearing housing in which the second bearing is mounted has a centerline arranged eccentrically relative to the rotational centerline of the transmission shaft. As mentioned above, the fitting seam allowances of the flange and the second bearing housing may be reversed, which will not be described in detail here.

Further, a flange is arranged between the transmission shaft and the second bearing housing. An eccentric sleeve is arranged between the second bearing housing and the outer ring of the second bearing. The eccentric sleeve may be a component such as a sleeve with multiple shaft segments. It is preferable that the inner hole of the concave seam allowance of the second bearing housing is arranged eccentrically relative to the outer cylindrical surface of the second bearing housing, and it is preferable that an inner hole of the eccentric sleeve with a single shaft segment in which the second bearing is mounted has a centerline arranged eccentrically relative to the rotational centerline of the transmission shaft. As mentioned above, the fitting seam allowances of the flange and the second bearing housing may be reversed, which will not be described in detail here.

Further, a flange is arranged between the transmission shaft and the second bearing housing. Preferably, the inner hole of the concave seam allowance of the second bearing housing is arranged eccentrically relative to the outer cylindrical surface of the second bearing housing, and the second bearing is a bearing with an eccentric outer ring. As mentioned before, the fitting seam allowances of flange and the second bearing housing may be reversed, which will not be described in detail here.

Further, an inner hole of the second bearing housing in which the second bearing is mounted is arranged eccentrically relative to the rotational centerline of the transmission shaft.

Further, an eccentric sleeve is arranged between the second bearing housing and the outer ring of the second bearing. The eccentric sleeve may be a component such as a sleeve with multiple shaft segments. Preferably, an inner hole of the eccentric sleeve with a single shaft segment in which the second bearing is mounted has a centerline arranged eccentrically relative to the rotational centerline of the transmission shaft.

Further, the second bearing is a bearing with an eccentric outer ring.

Further, an eccentric sleeve is arranged between the second bearing housing and the outer ring of the second bearing. The eccentric sleeve may be a component such as a sleeve with multiple shaft segments. An inner hole of the second bearing housing in which the eccentric sleeve is mounted has a centerline arranged eccentrically relative to the rotational centerline of the transmission shaft, and it is preferable that an inner hole of the eccentric sleeve with a single shaft segment in which the second bearing is mounted has a centerline arranged eccentrically relative to the rotational centerline of the transmission shaft.

Further, the inner hole of the second bearing housing in which the second bearing is mounted has a centerline arranged eccentrically relative to the rotational centerline of the transmission shaft, and the second bearing is a bearing with an eccentric outer ring.

Further, an eccentric sleeve is arranged between the second bearing housing and the outer ring of the second bearing. The eccentric sleeve may be a component such as a sleeve with multiple shaft segments. Preferably, an inner hole of the eccentric sleeve with a single shaft segment in which the second bearing is mounted has a centerline arranged eccentrically relative to the rotational centerline of the transmission shaft, and the second bearing is a bearing with an eccentric outer ring.

Further, a balance weight is provided on a side of the transmission shaft connected to the mixing shaft. The balance weight rotates synchronously with the transmission shaft and is used for dynamically balancing the transmission shaft on a single side. Its specific position and size are determined according to actual conditions.

Further, balance weights are provided on both a side of the transmission shaft connected to the mixing shaft and a side of the transmission shaft connected to the vibration transmission device and are used for dynamically balancing the transmission shaft on both sides. Both the balance weights rotate synchronously with the transmission shaft. Their specific positions and sizes are determined according to actual conditions.

The present disclosure has the following advantageous effects.

1. The present disclosure provides a vibration device for a mixing machine, which has a simple structure and operates stably and reliably.
2. A specific eccentric design and a specific design of a vibration transmission device can be implemented according to specific materials, so that the mixing device is imparted with a given amplitude and frequency and is highly adaptable to different materials.
3. During operation, the amplitude and frequency are not affected by the load, and stable vibration performance is achieved. The mixed blend materials have good uniformity.
4. The transmission shaft and the second bearing housing are fitted with each other by means of seam allowances, which have a simple structure, allow for easy positioning and connection, and are manufactured with low cost.
5. A flange is arranged between the transmission shaft and the second bearing housing and they are fitted with one another by means of seam allowances, which allows for easy positioning and connection, allows an eccentric solution to be implemented more flexibly and diversely, and allows for easy assembly, disassembly, and maintenance.
6. Due to a dynamic balance design, the vibration device operates stably, and the equipment has high reliability.

Figure 1:
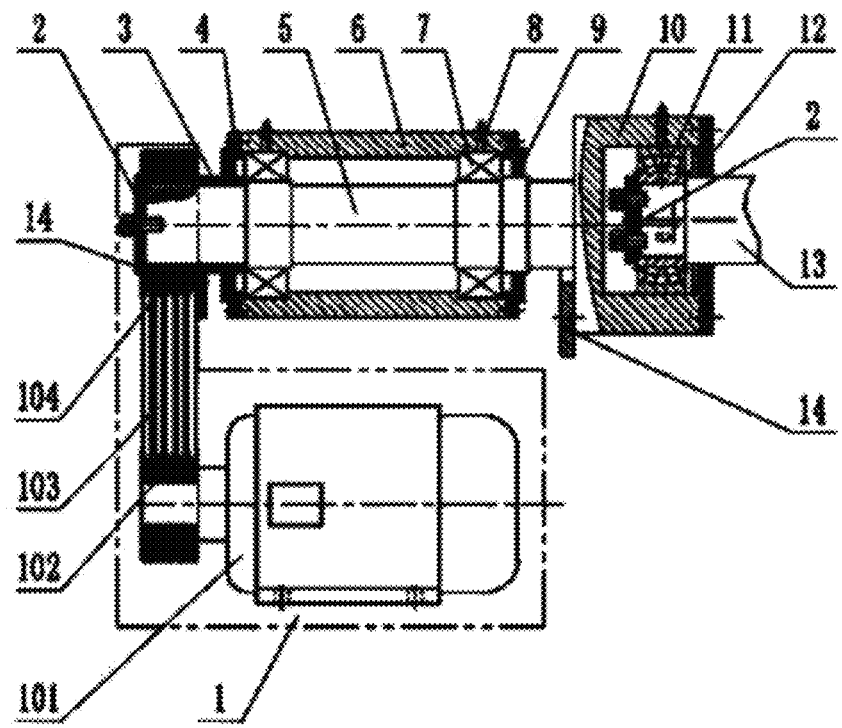
FIGS. 1 to 49 are schematic structural diagrams of vibration devices of Embodiments 1 to 49 of the present disclosure, respectively.
Figure 2:
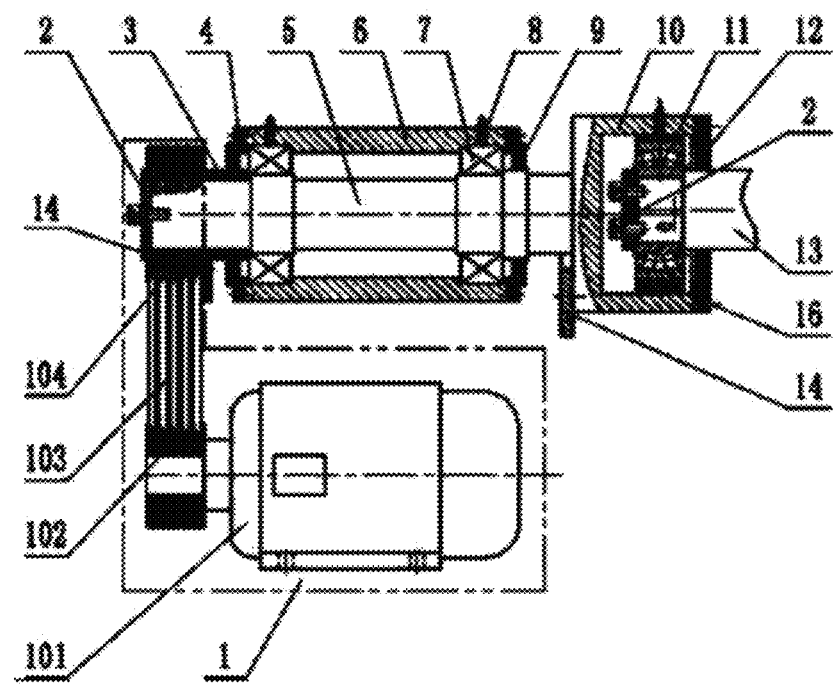
Figure 3:
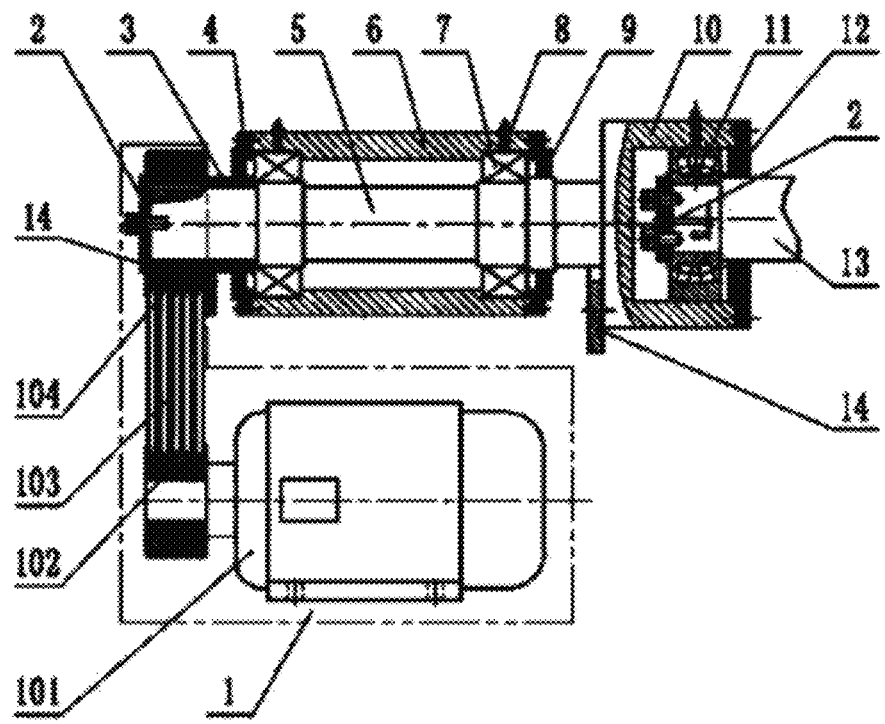
Figure 4:
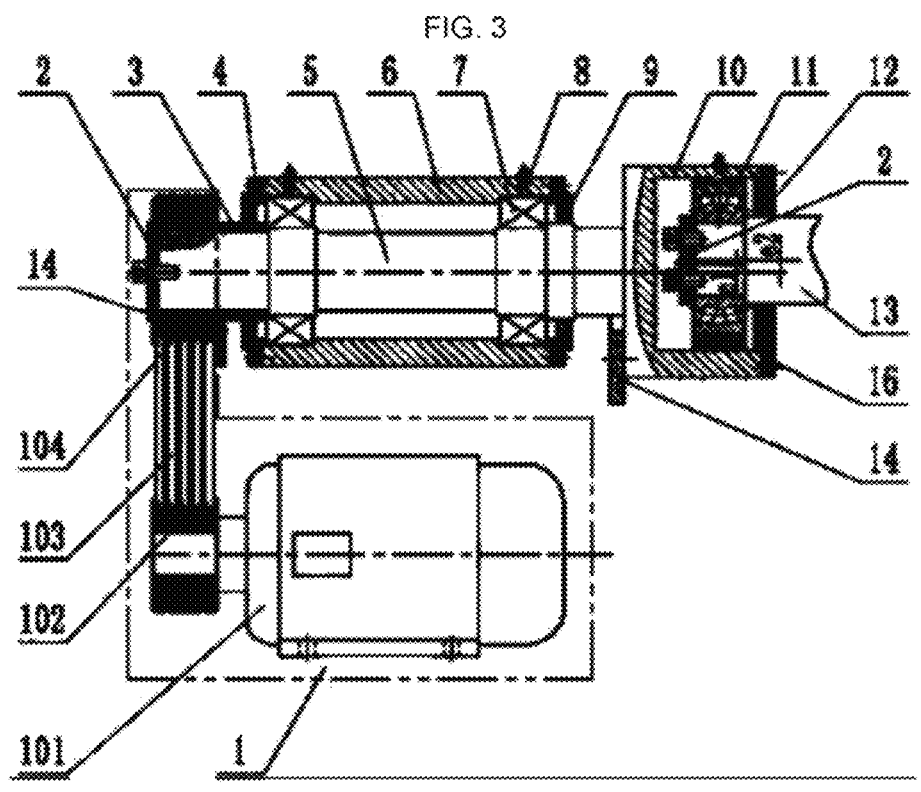
Figure 5:
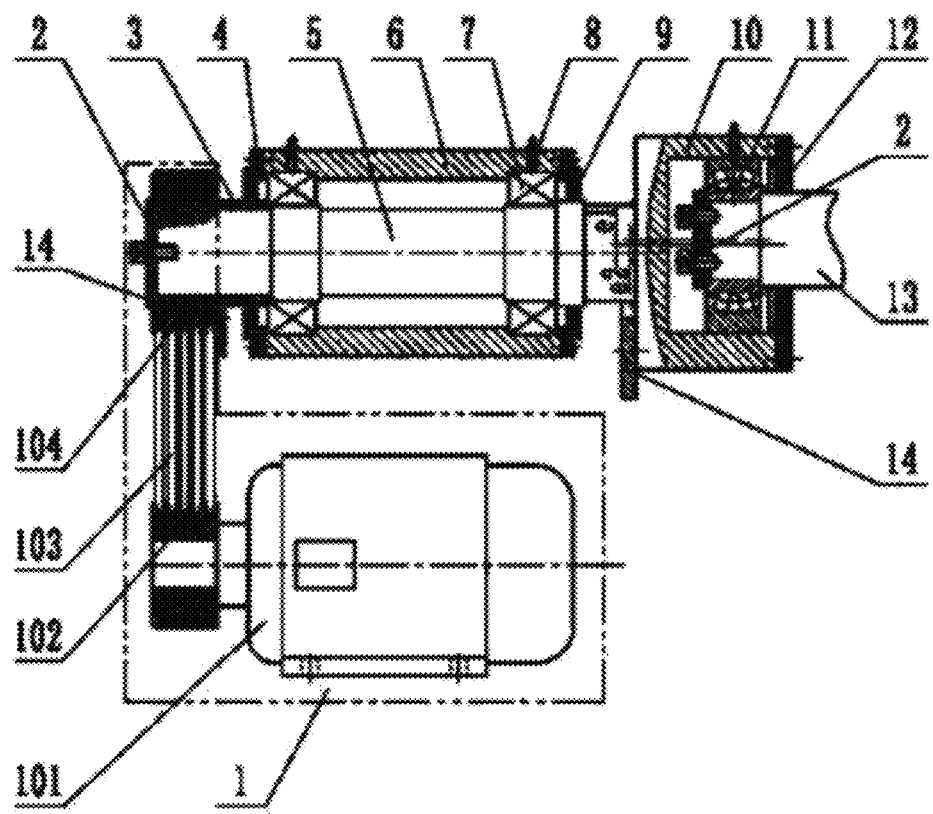
Figure 6:
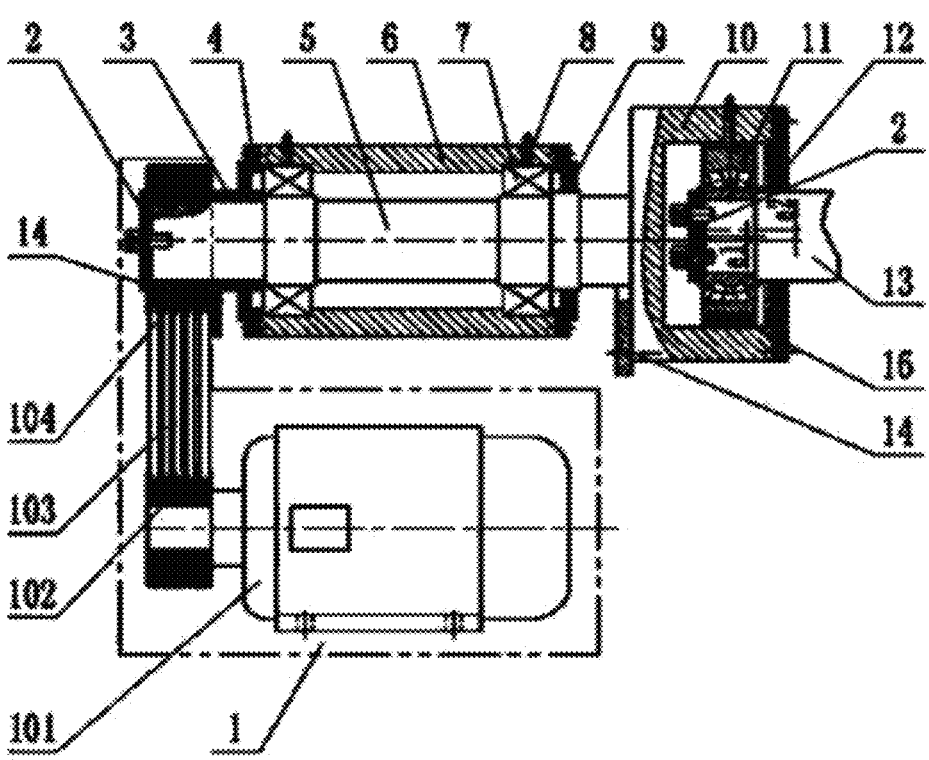
Figure 7:
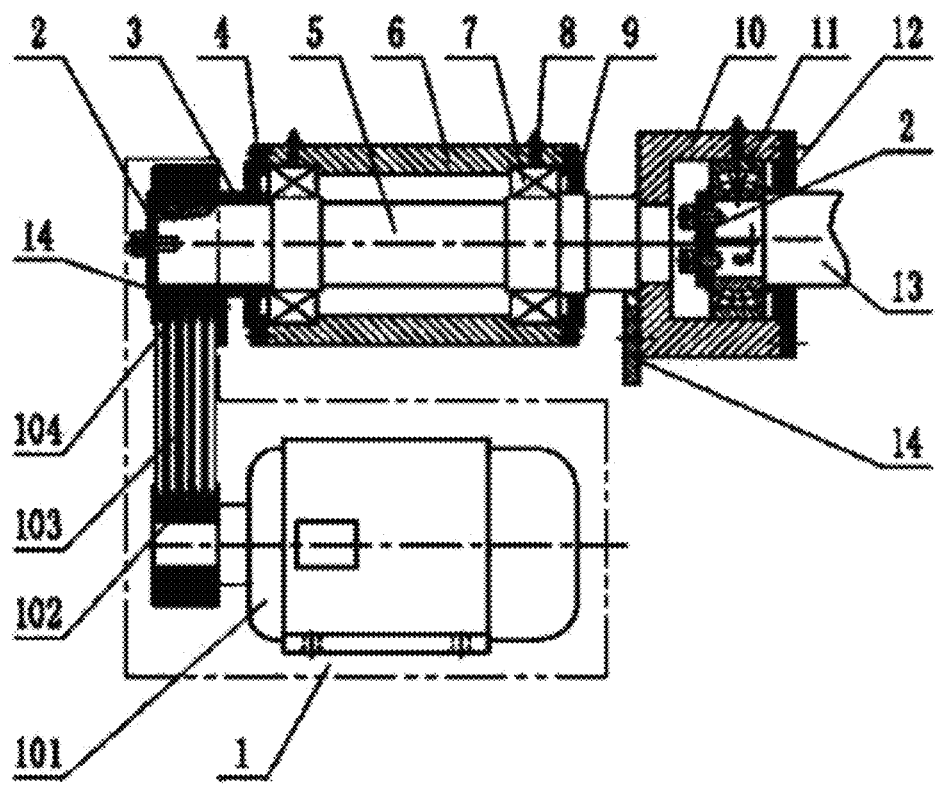
Figure 8:
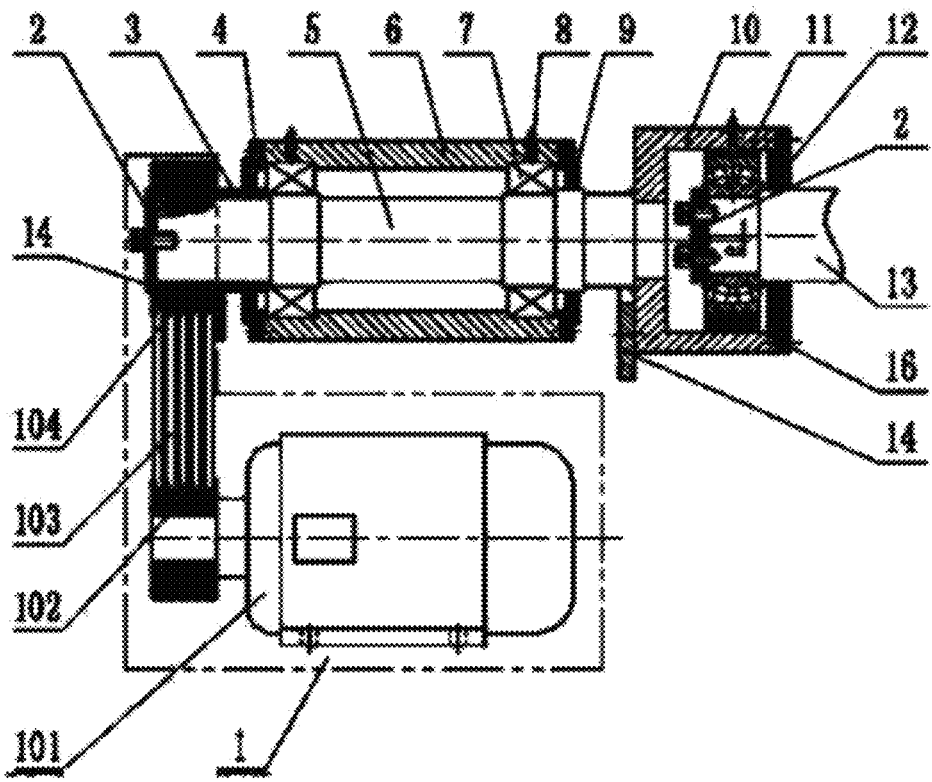
Figure 9:
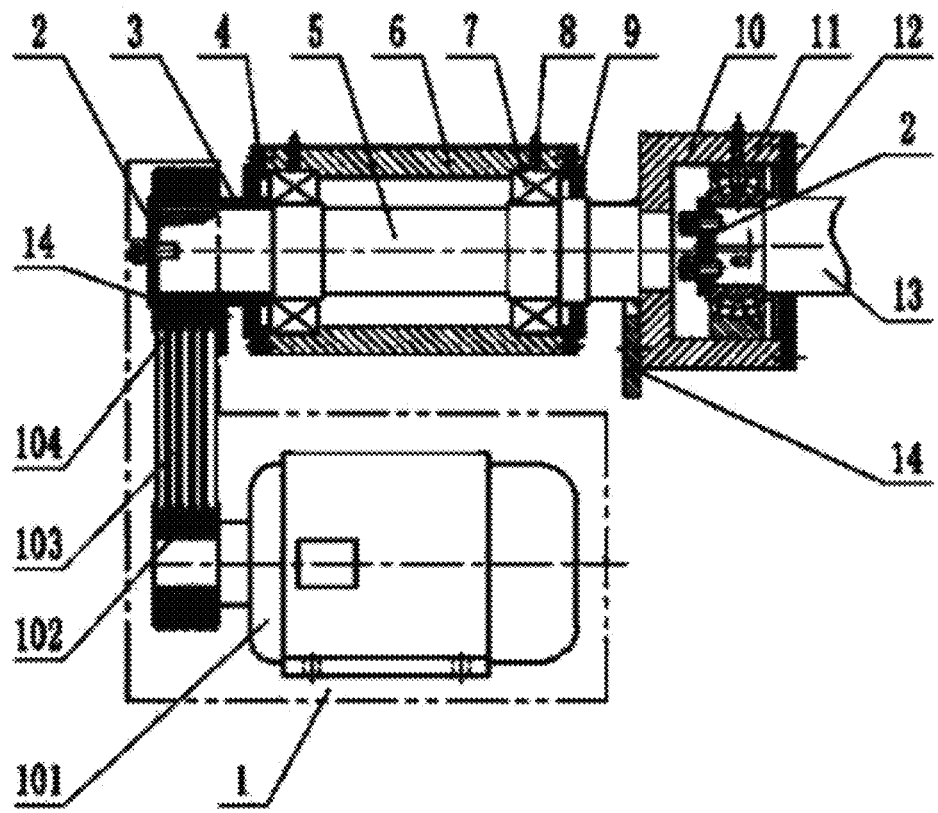
Figure 10:
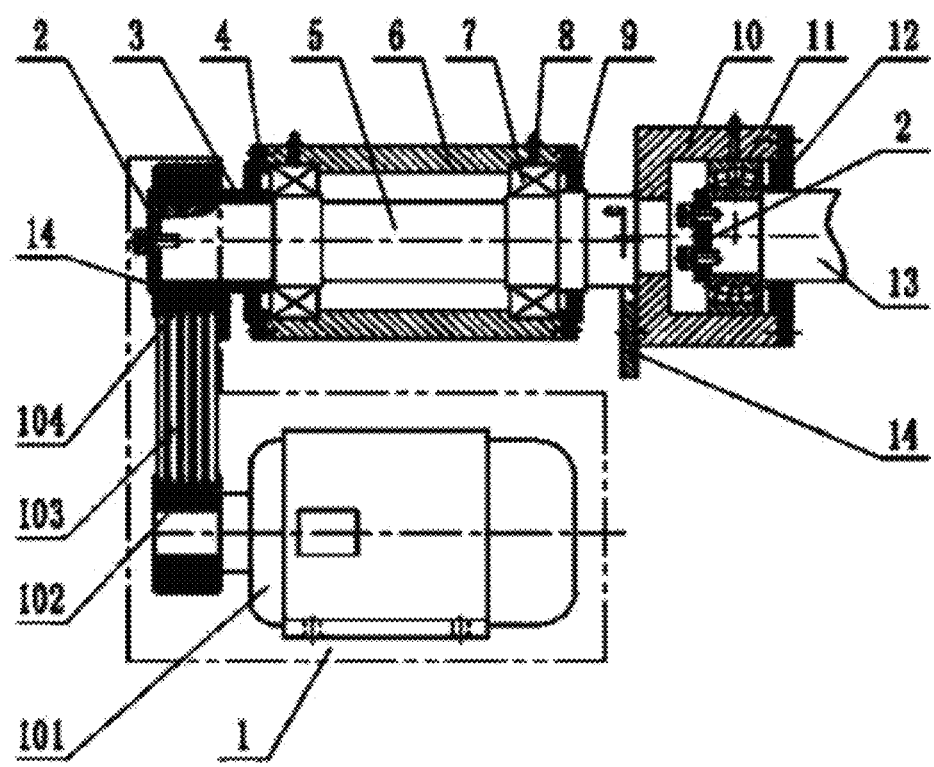
Figure 11:
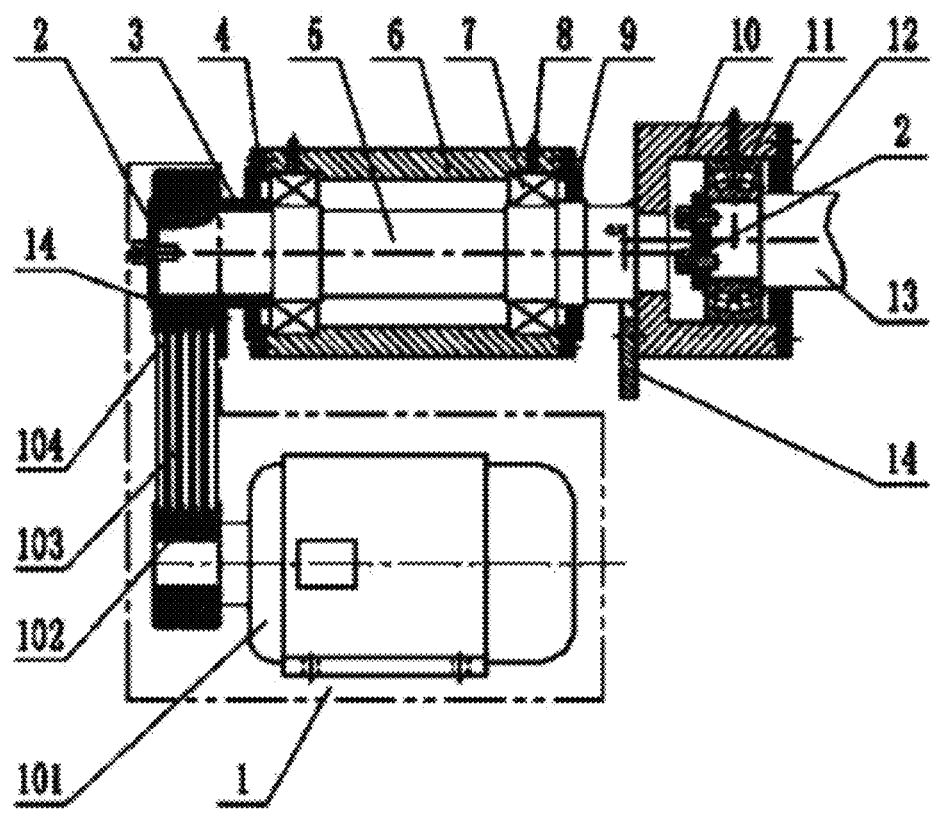
Figure 12:
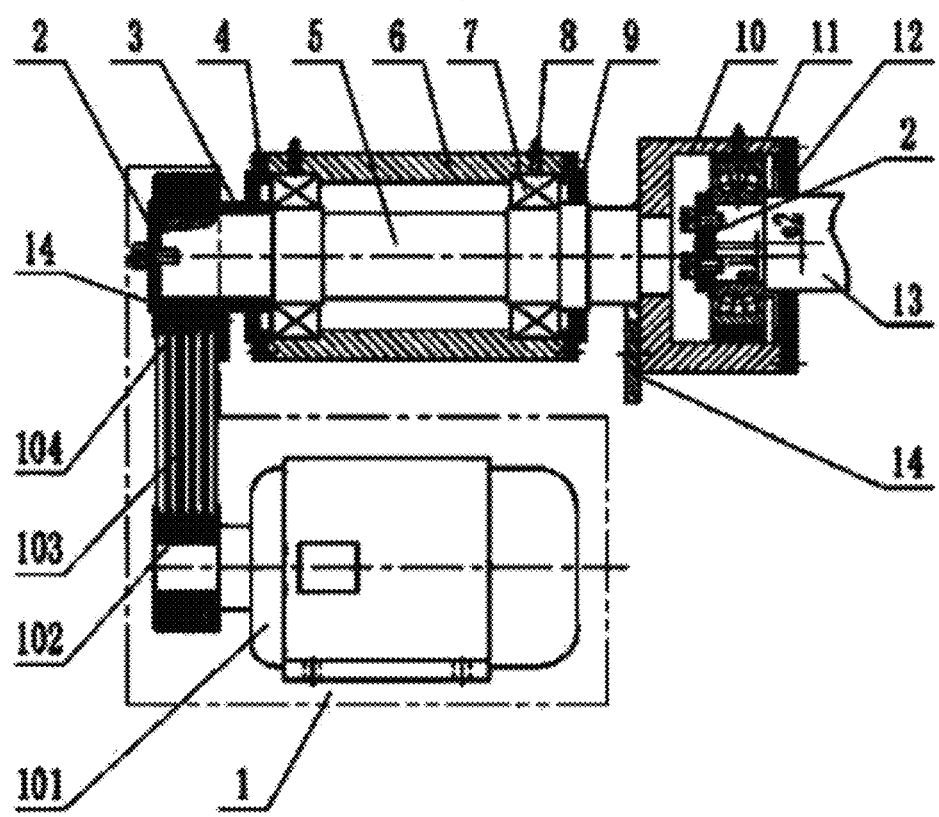
Figure 13:
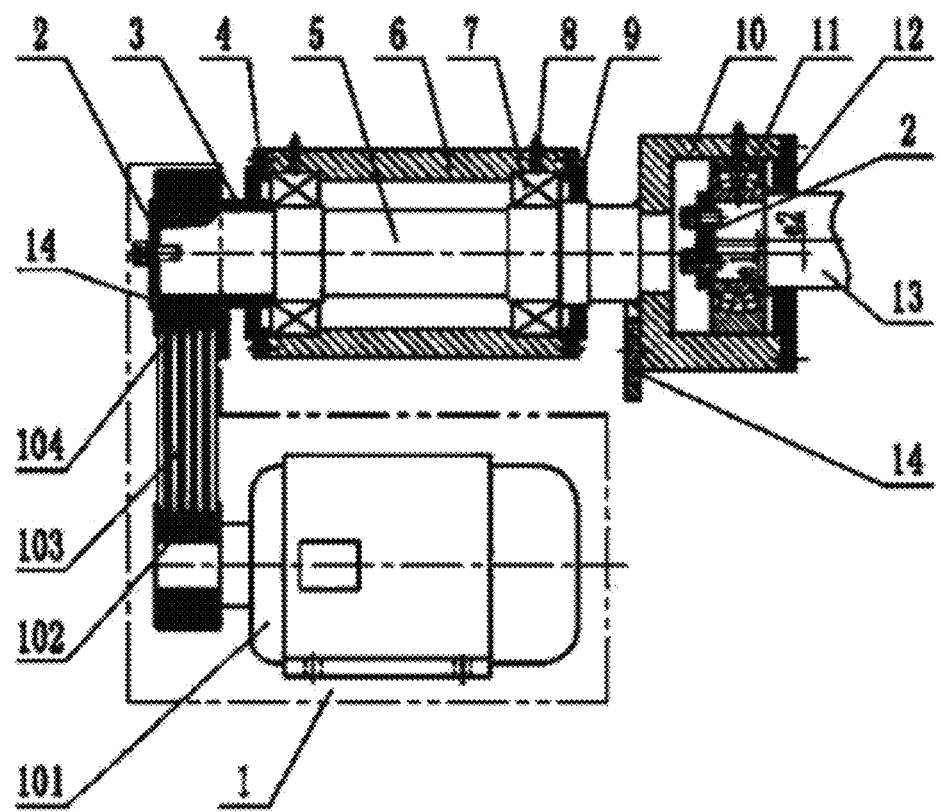
Figure 14:
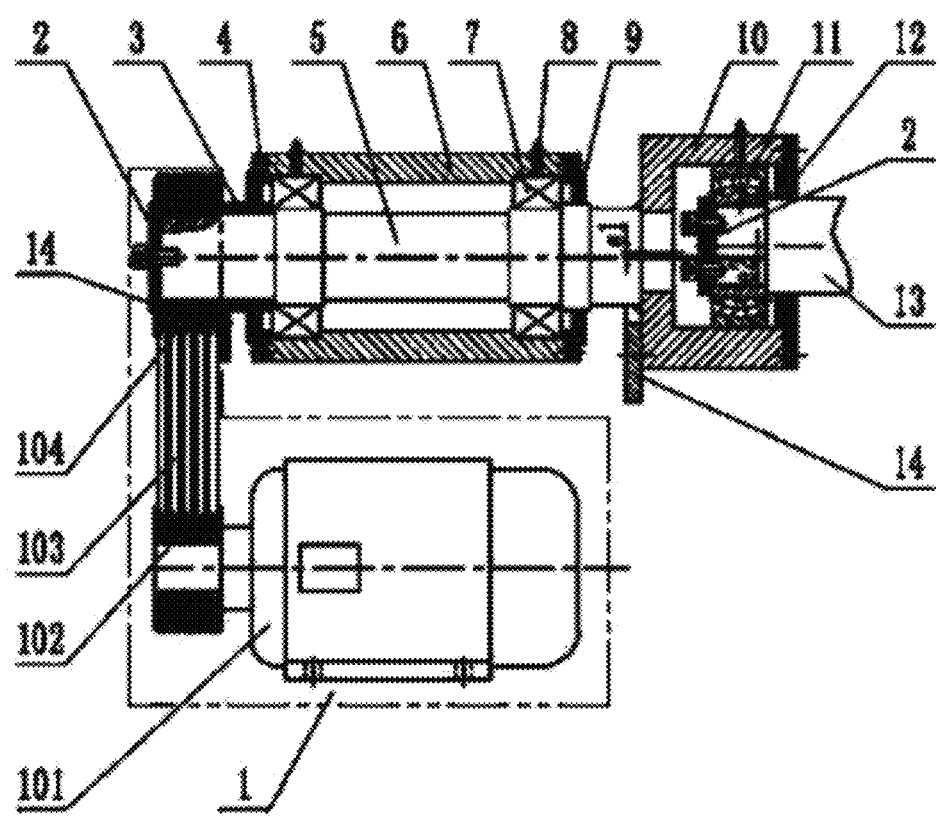
Figure 15:
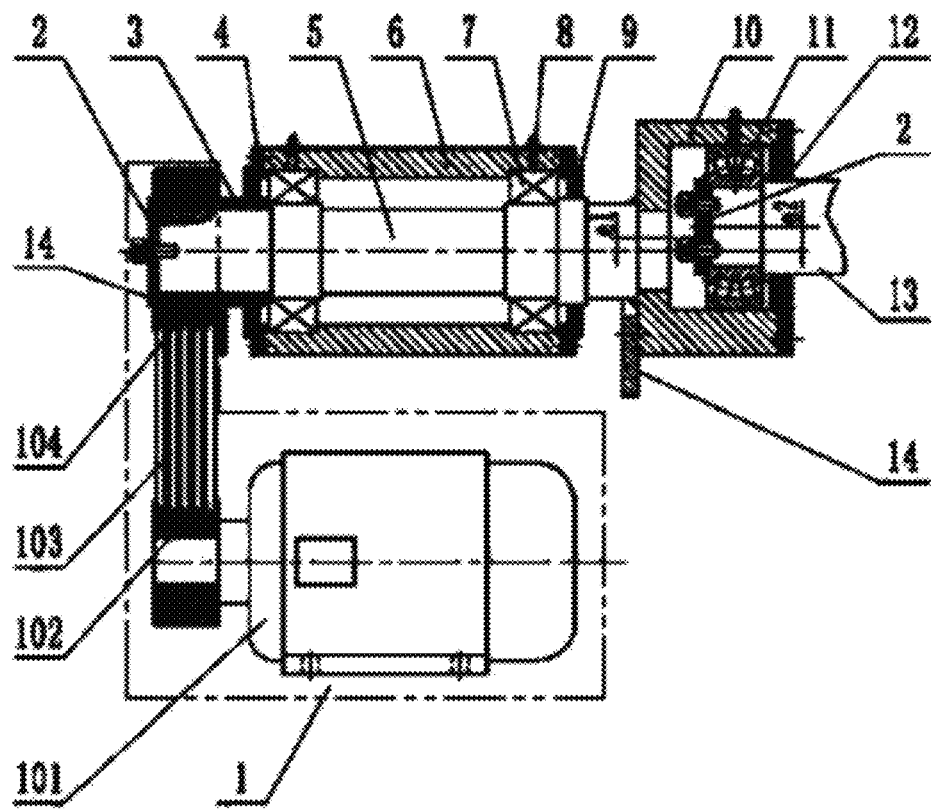
Figure 16:
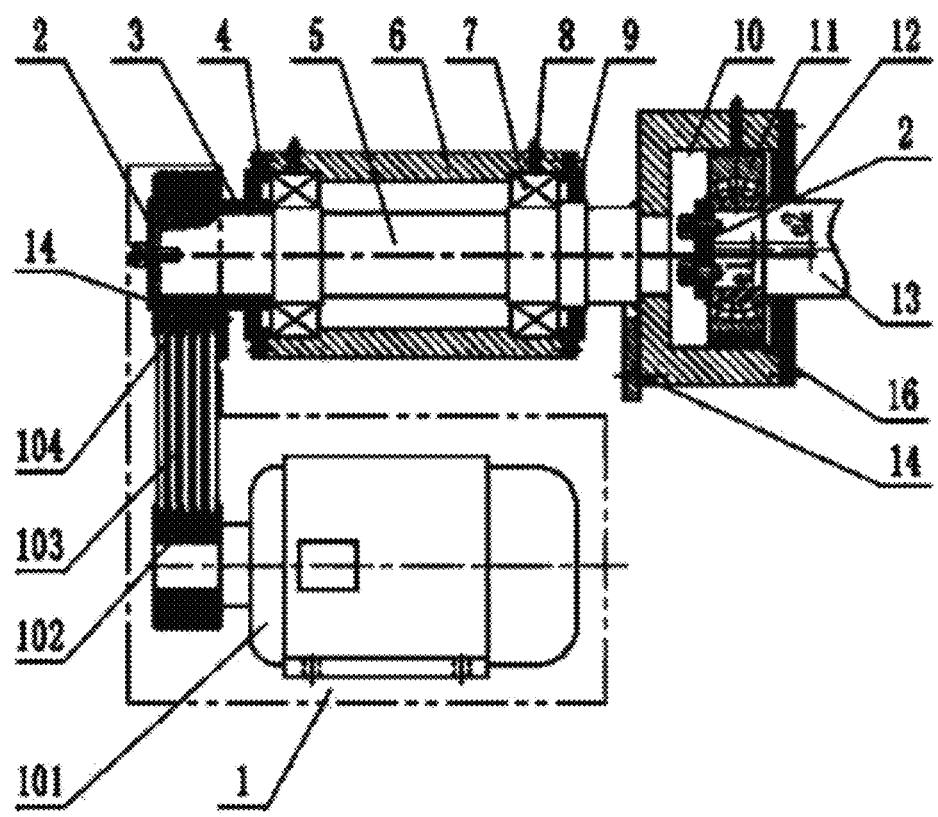
Figure 17:
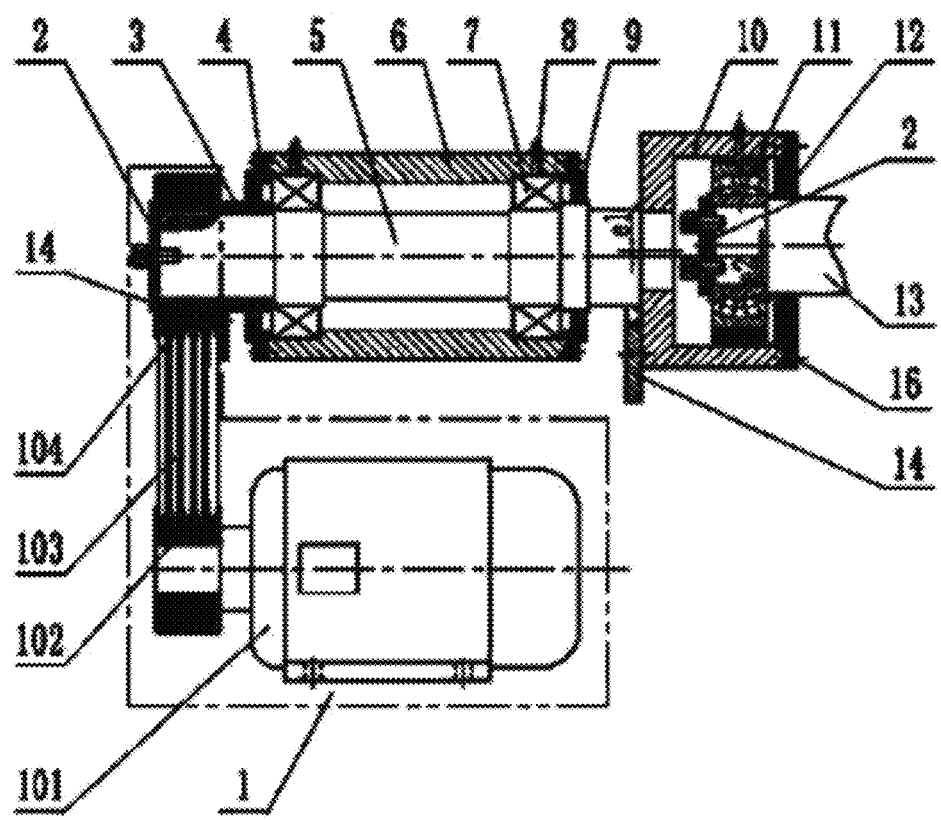
Figure 18:
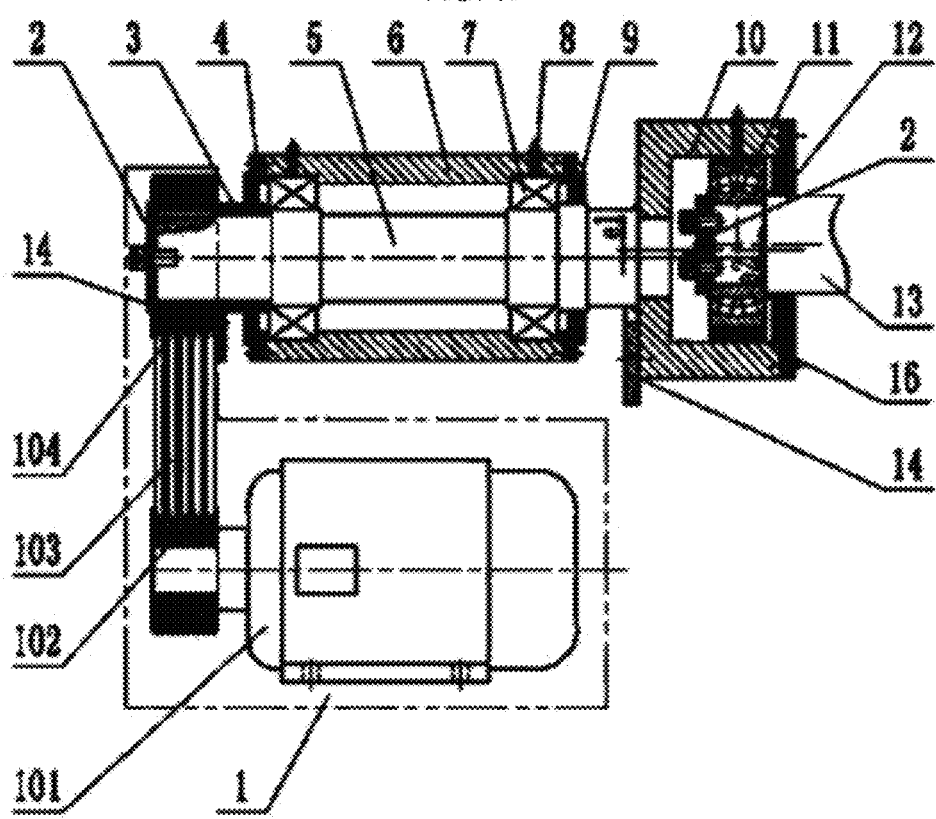
Figure 19:
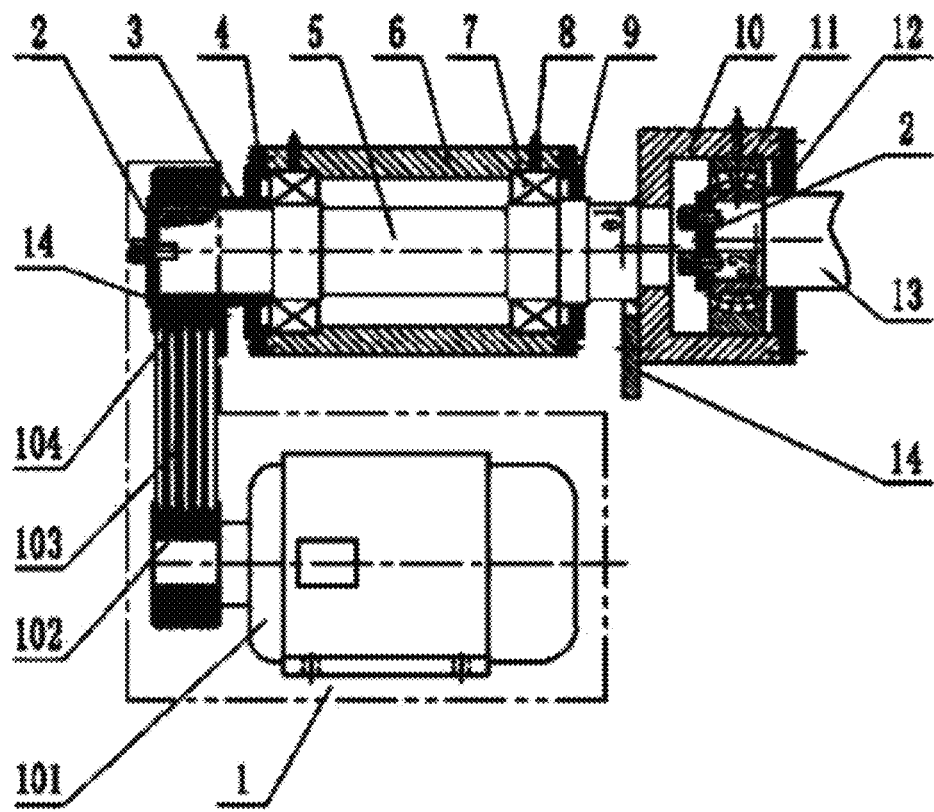
Figure 20:
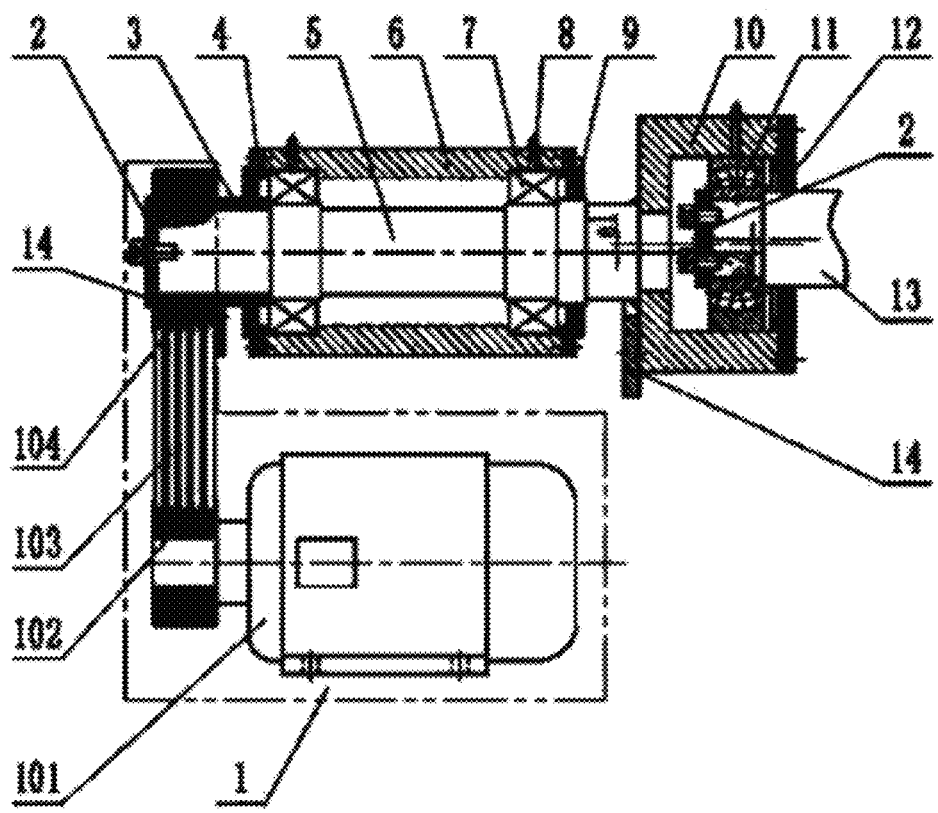
Figure 21:
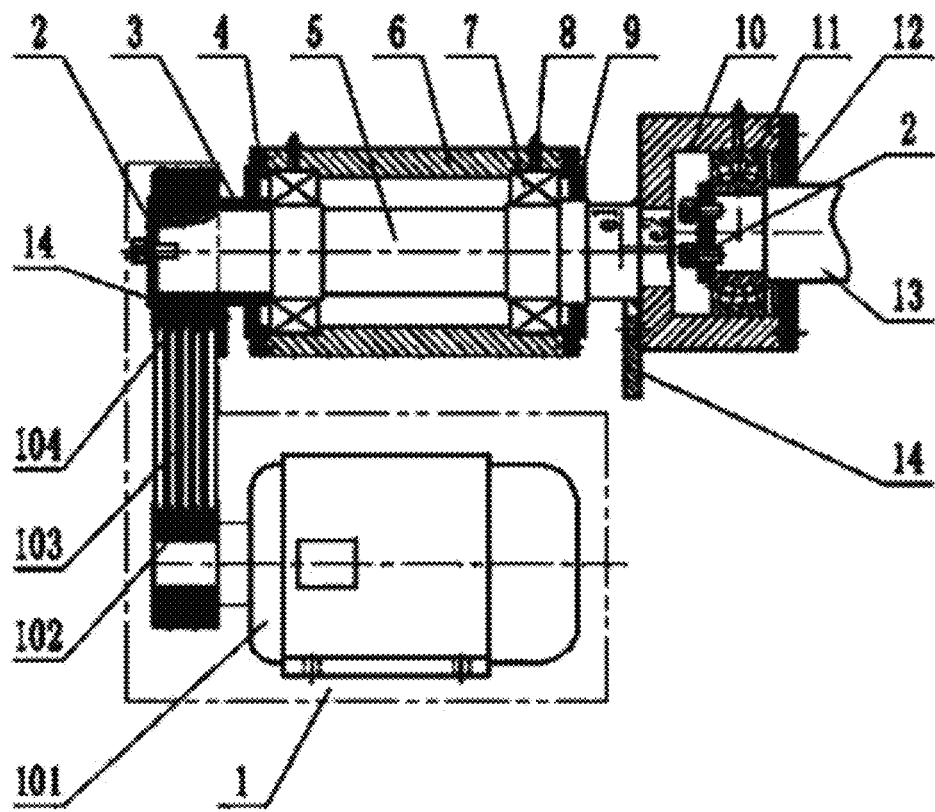
Figure 22:
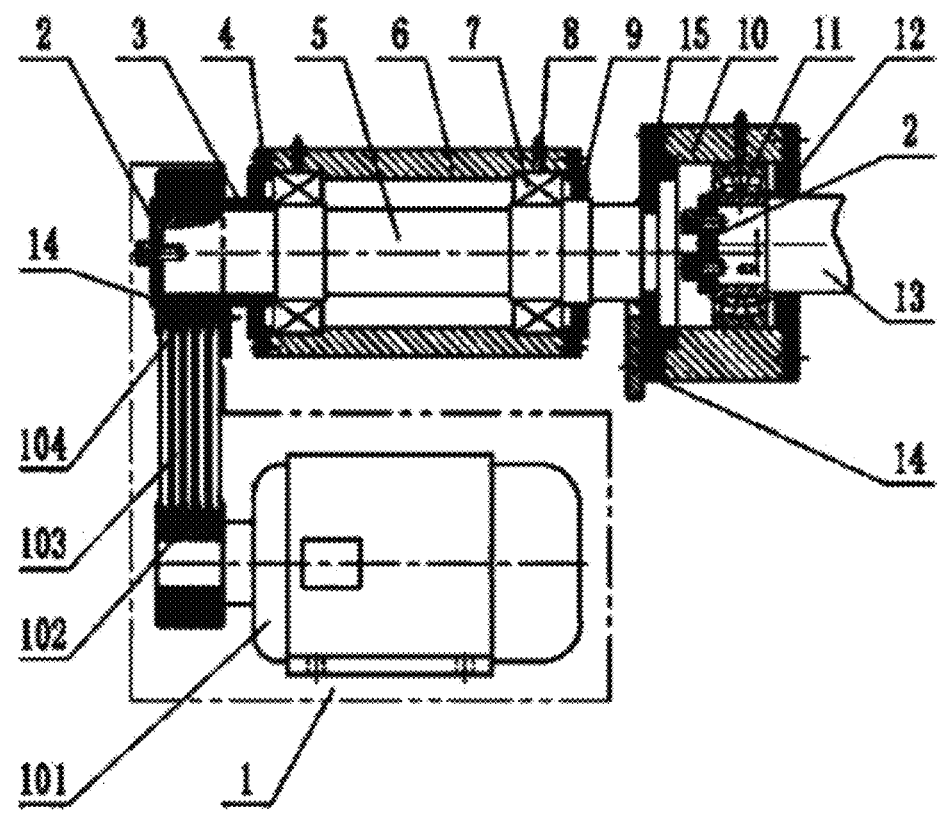
Figure 23:
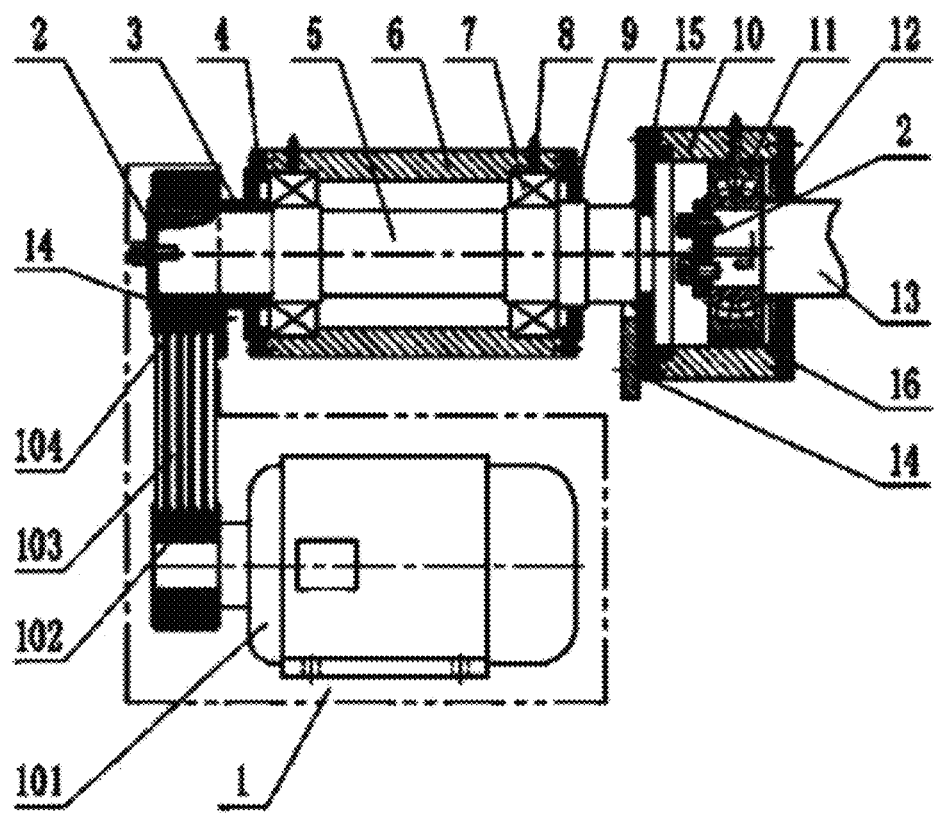
Figure 24:
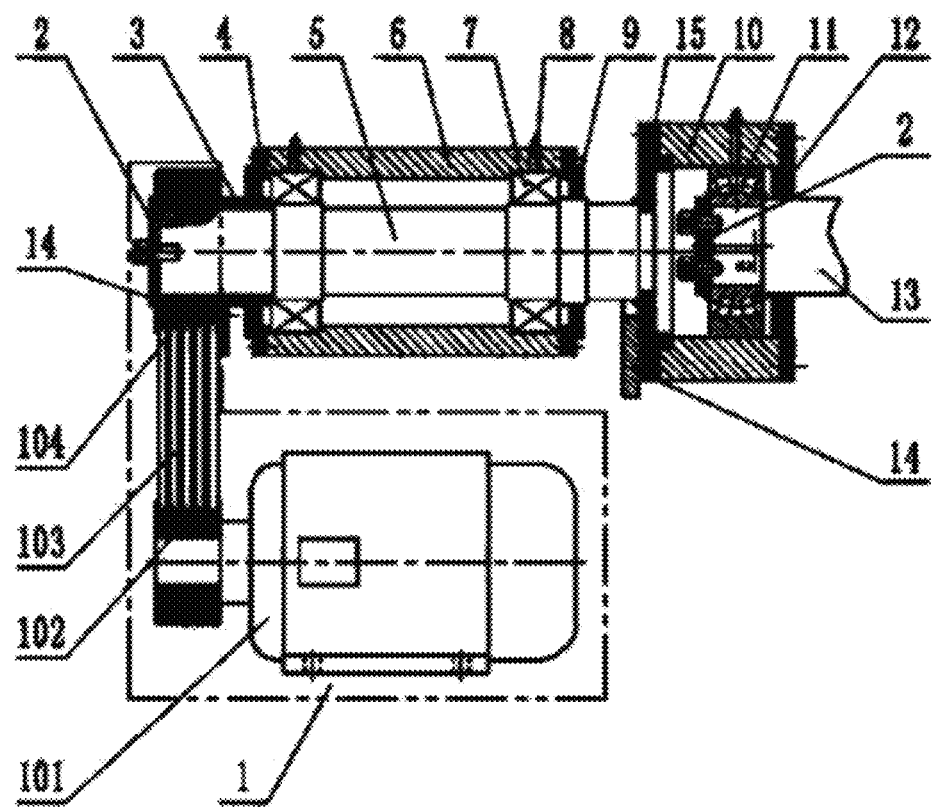
Figure 25:
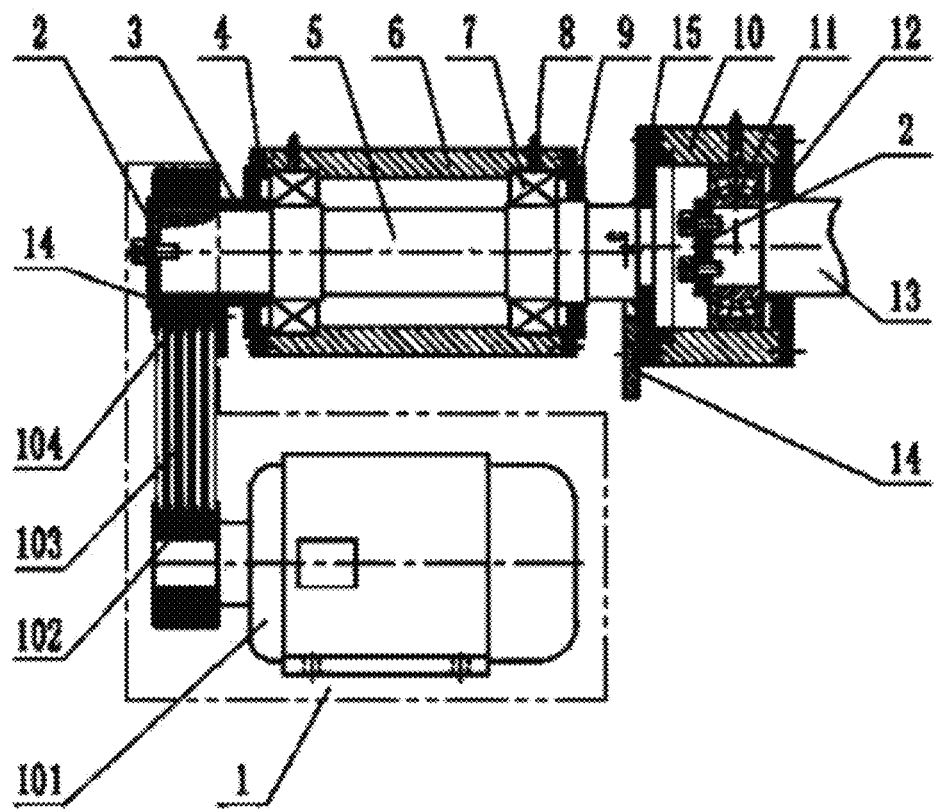
Figure 26:
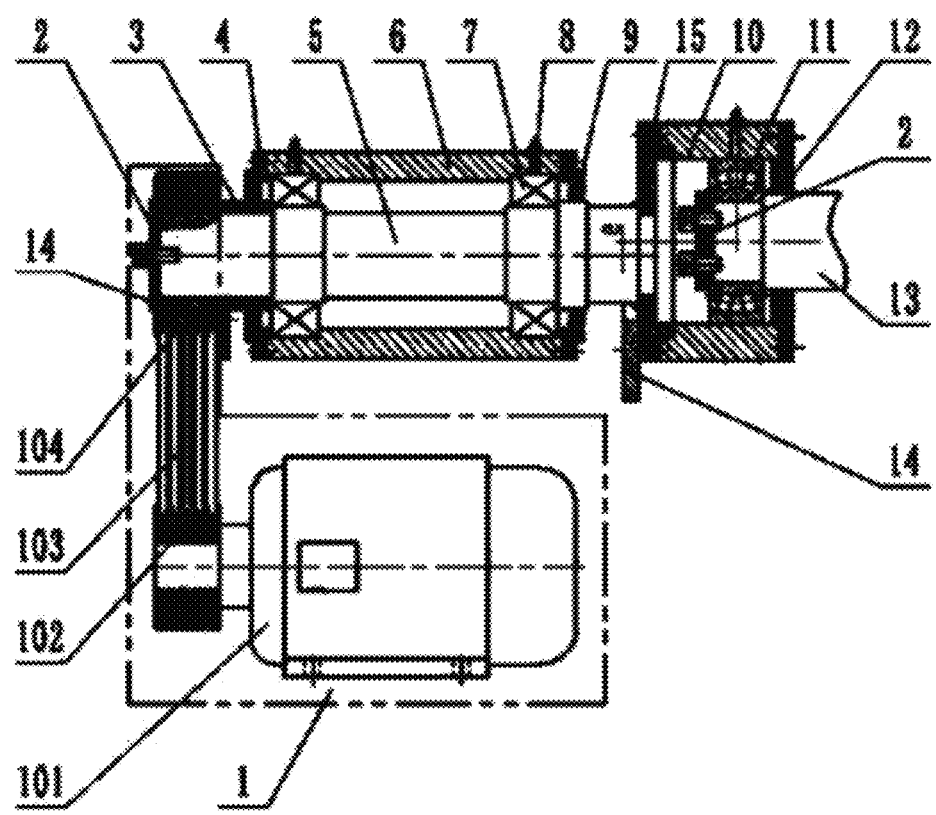
Figure 27:
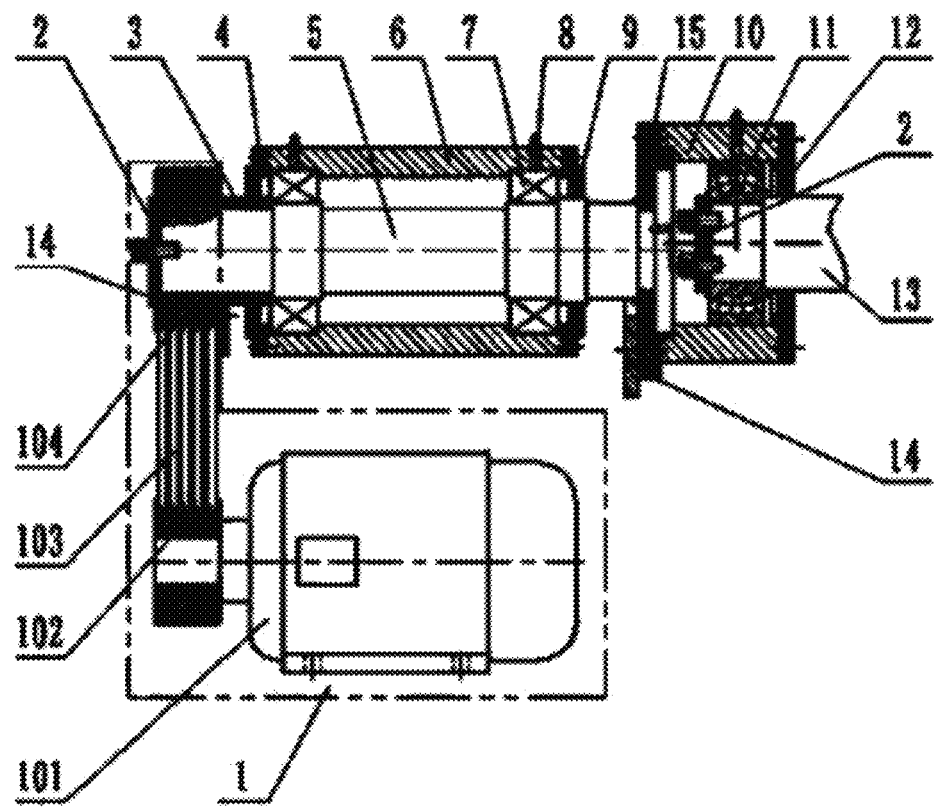
Figure 28:
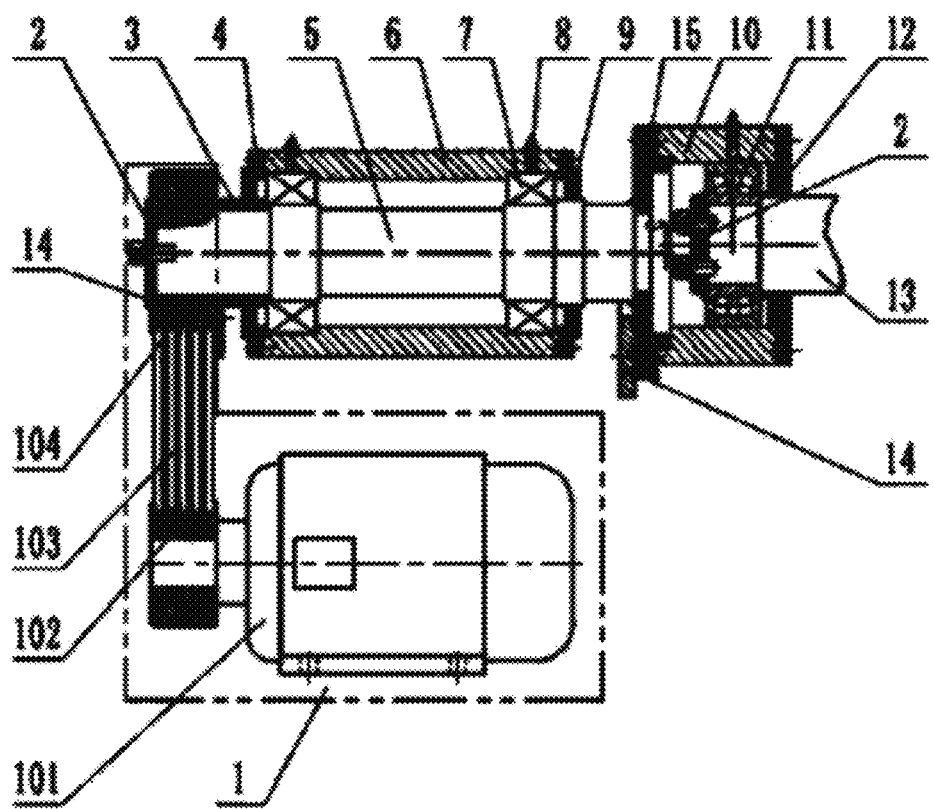
Figure 29:
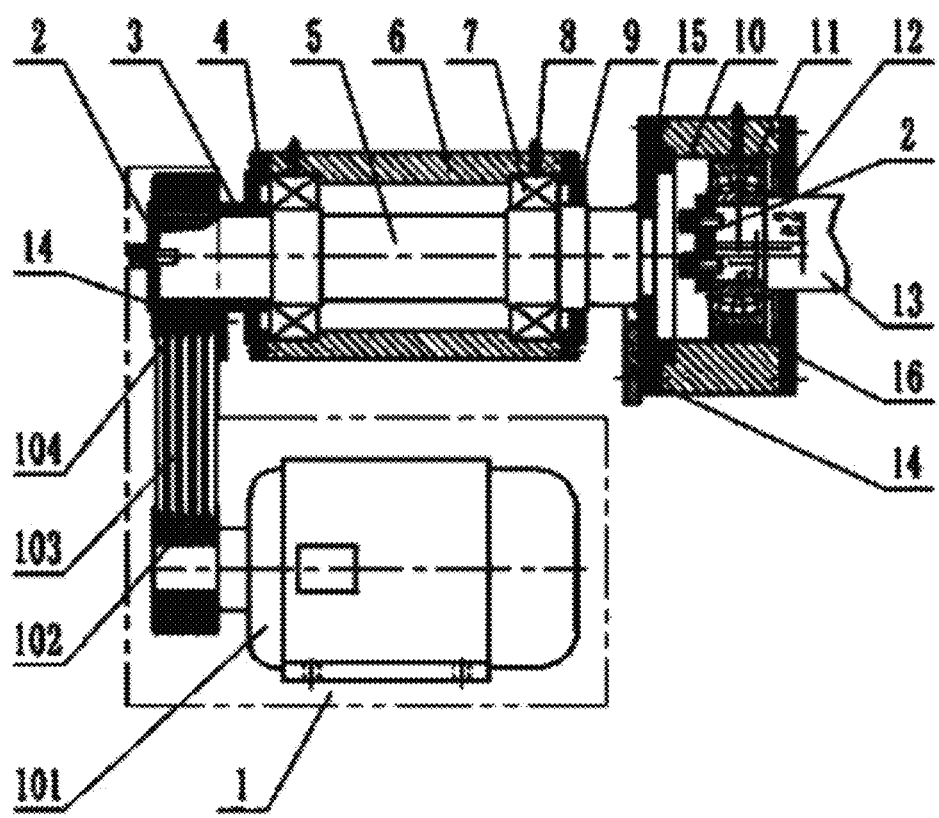
Figure 30:
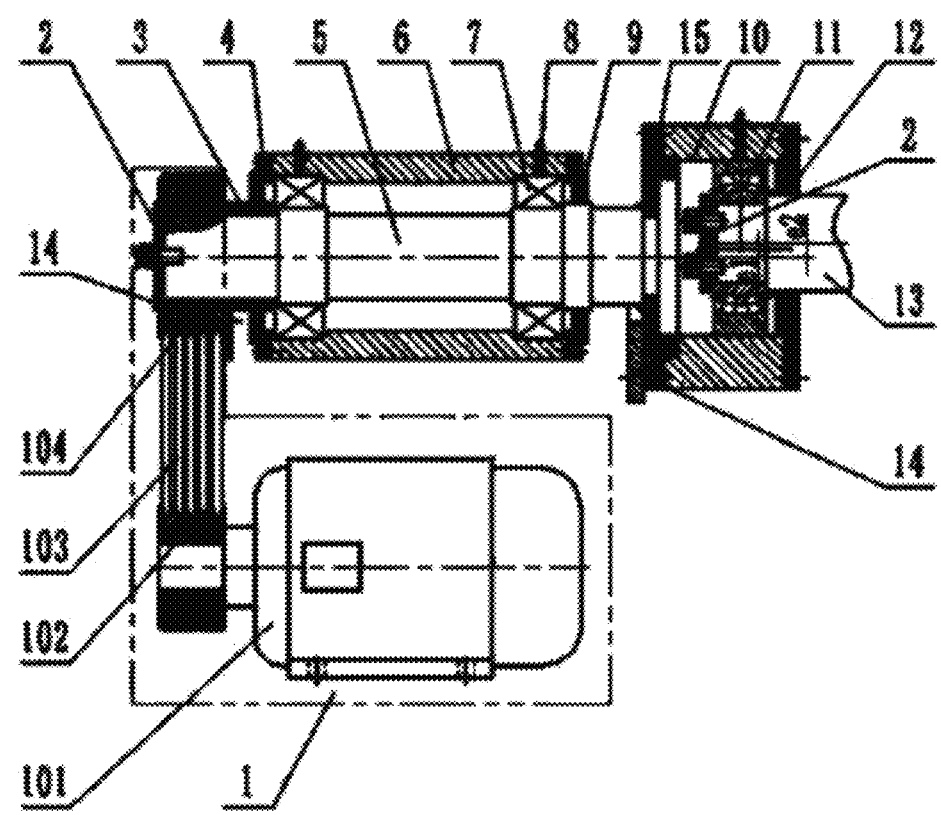
Figure 31:
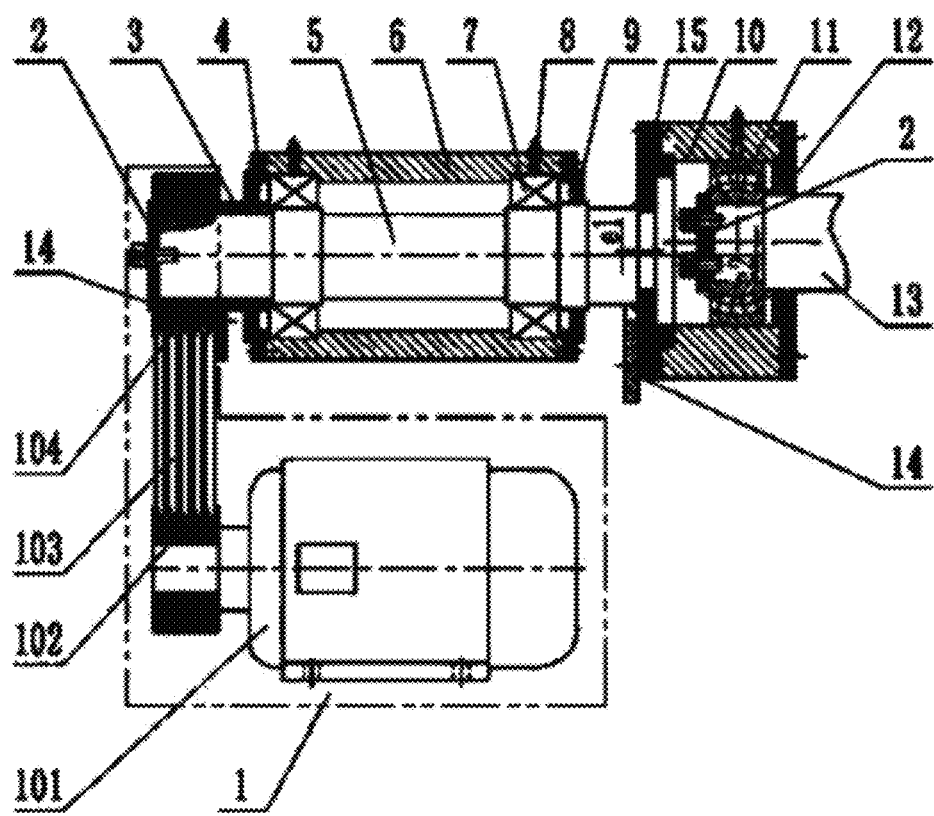
Figure 32:
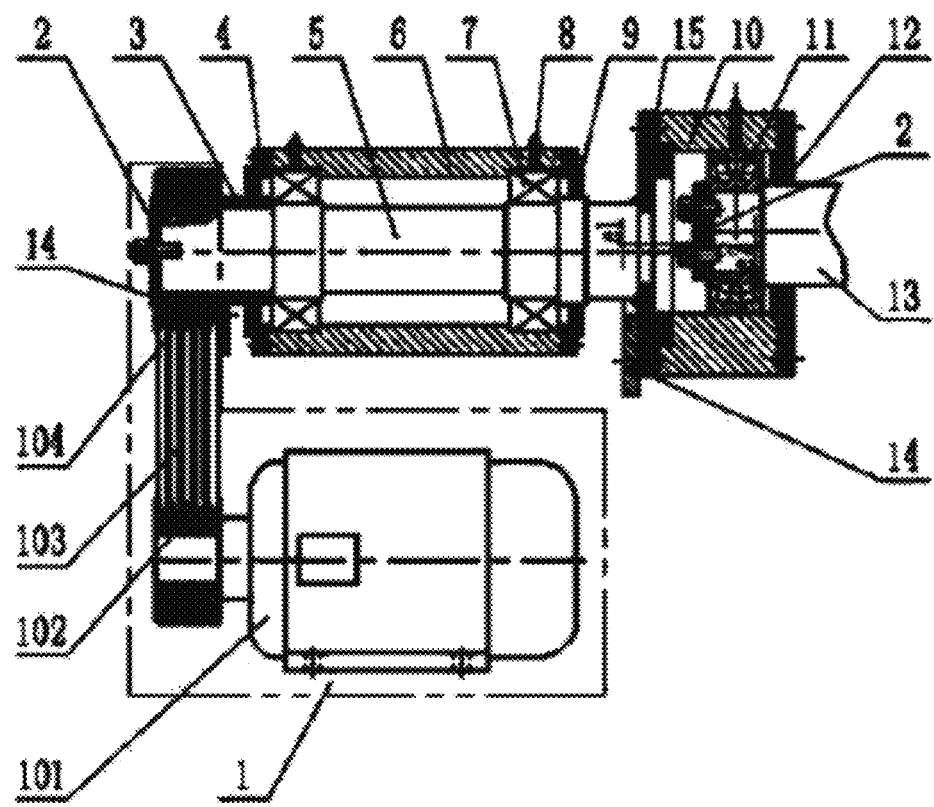
Figure 33:
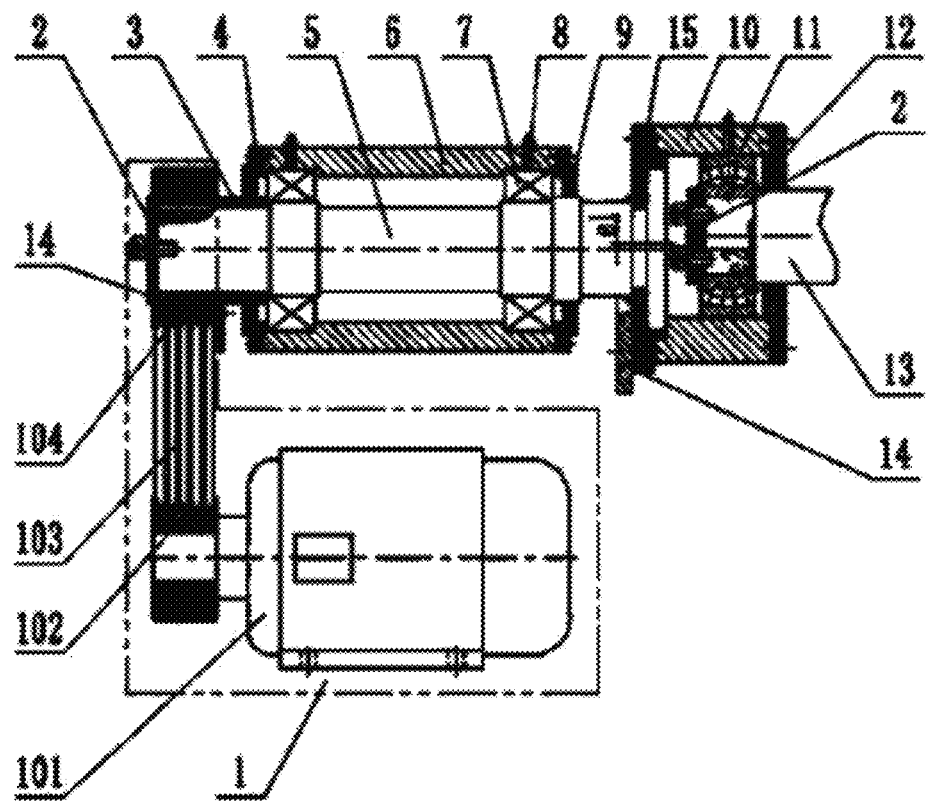
Figure 34:
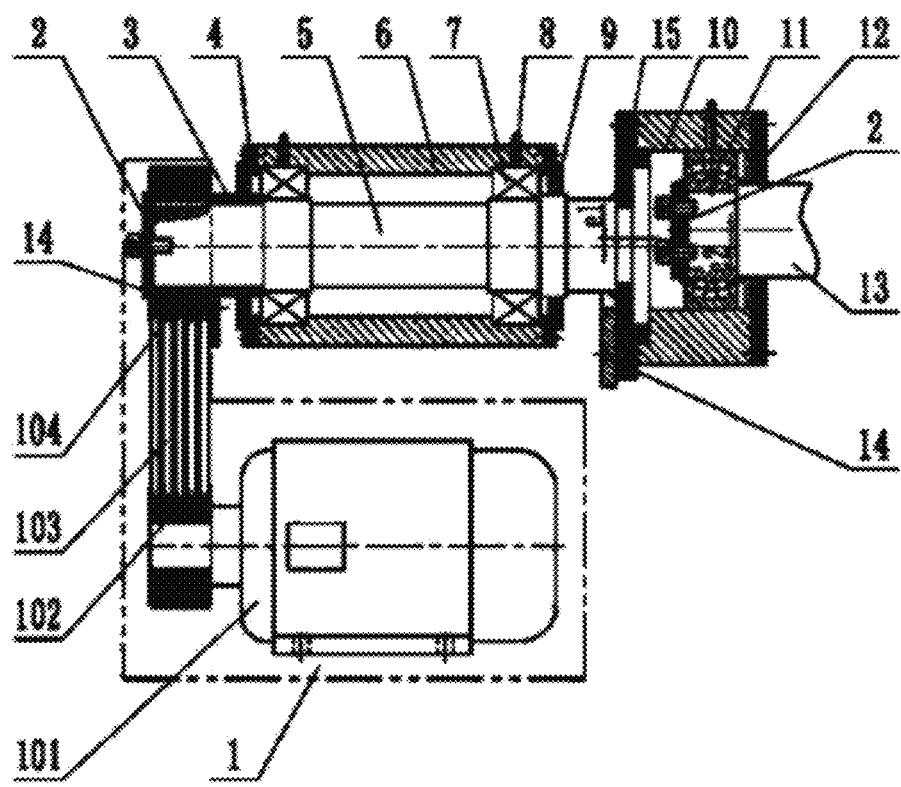
Figure 35:
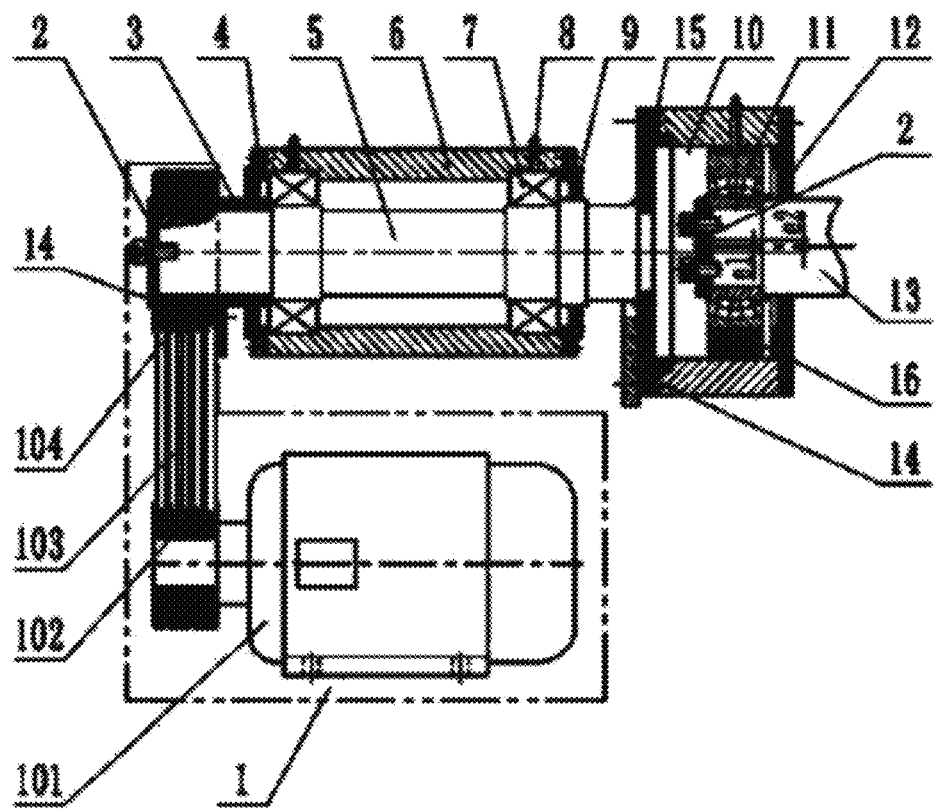
Figure 36:
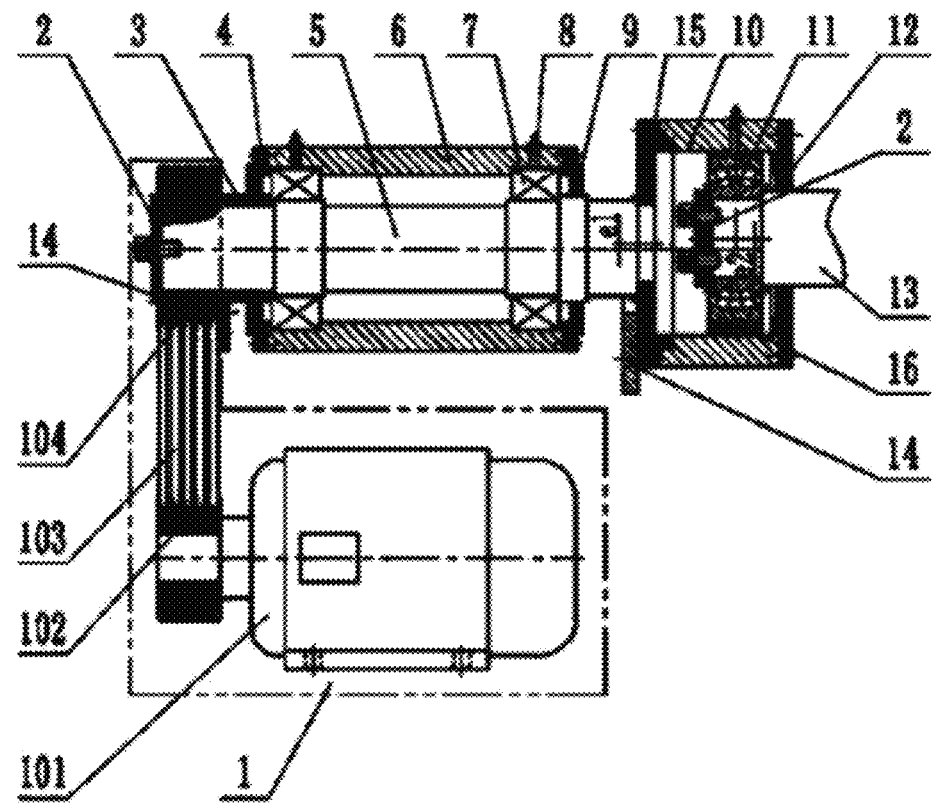
Figure 37:
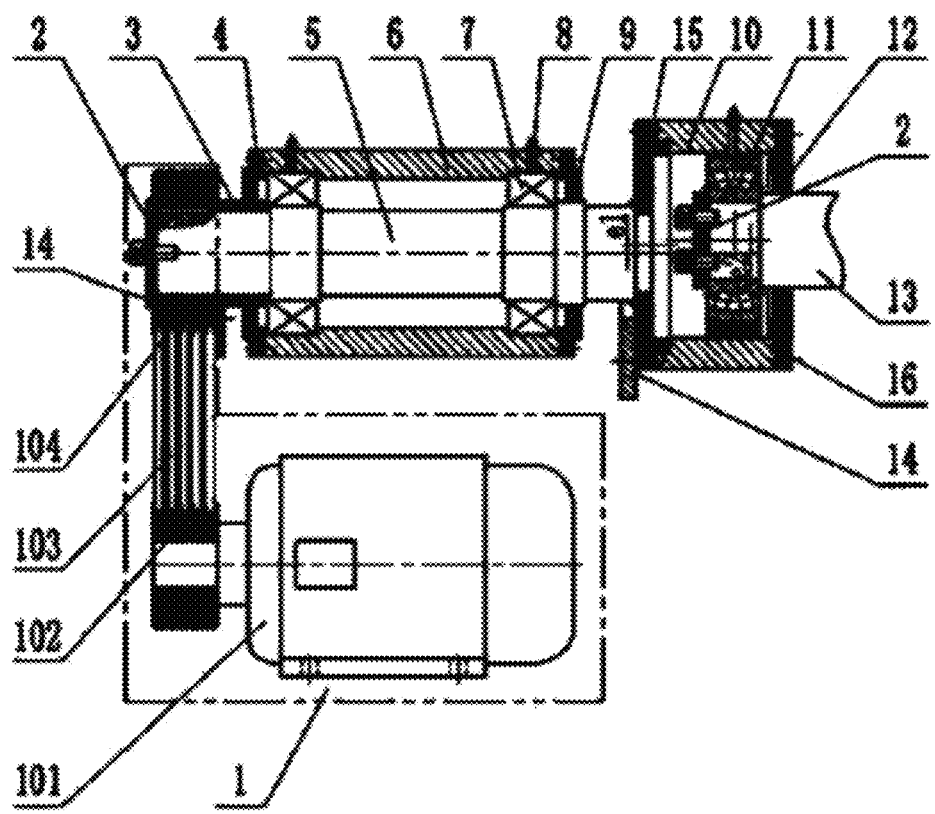
Figure 38:
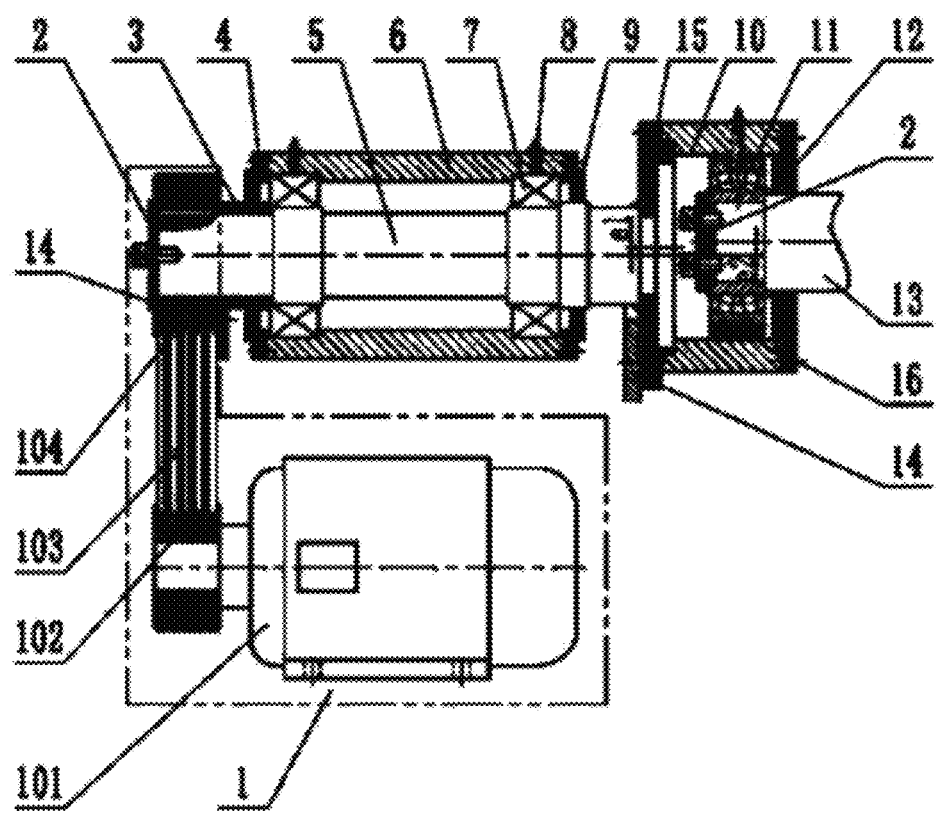
Figure 39:
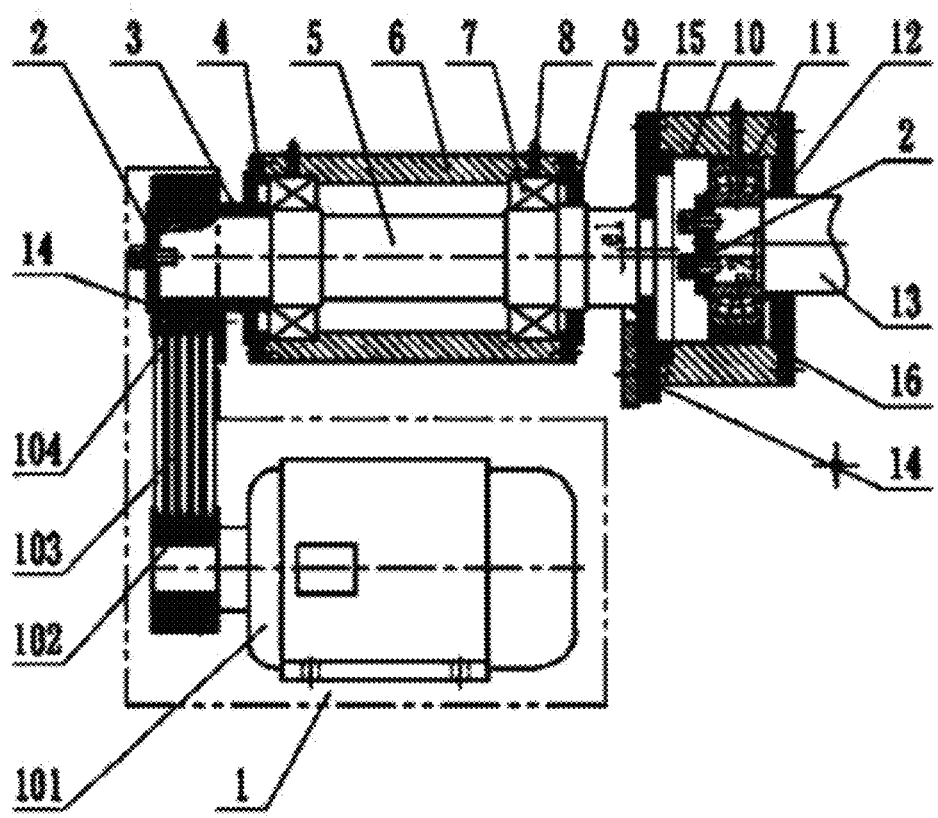
Figure 40:
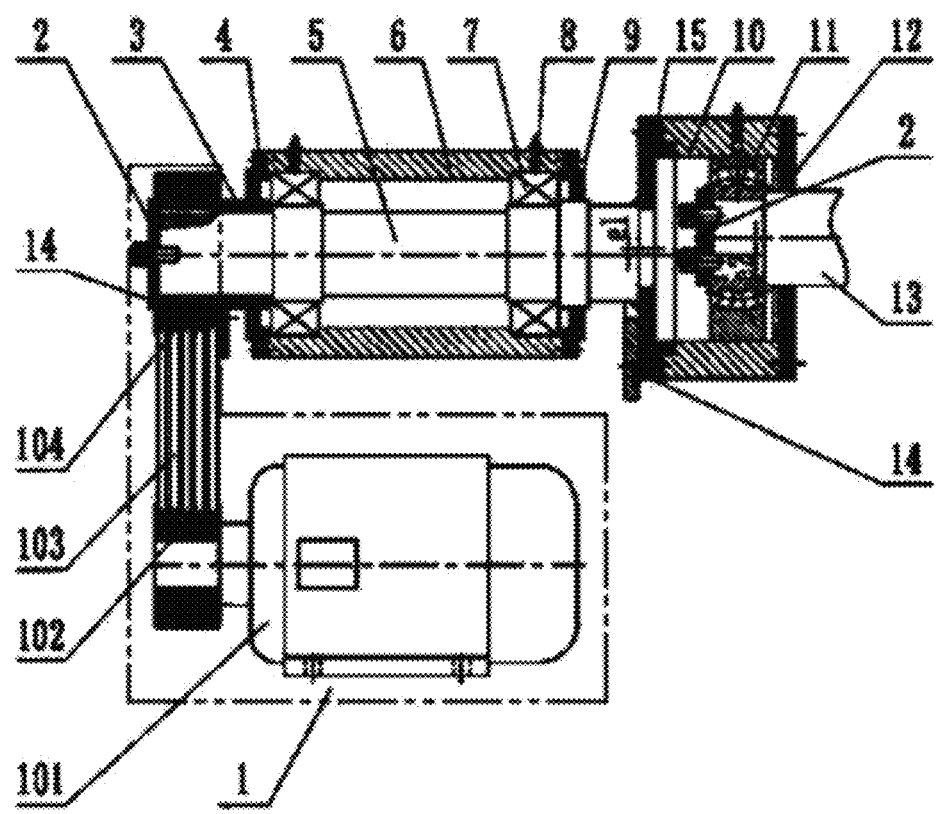
Figure 41:
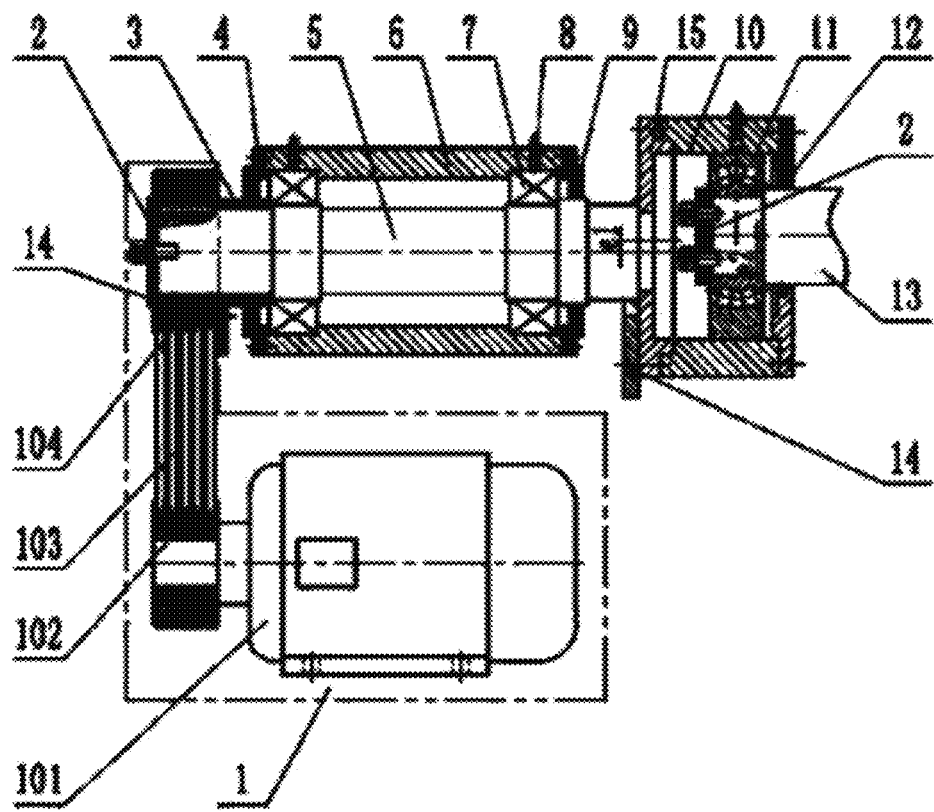
Figure 42:
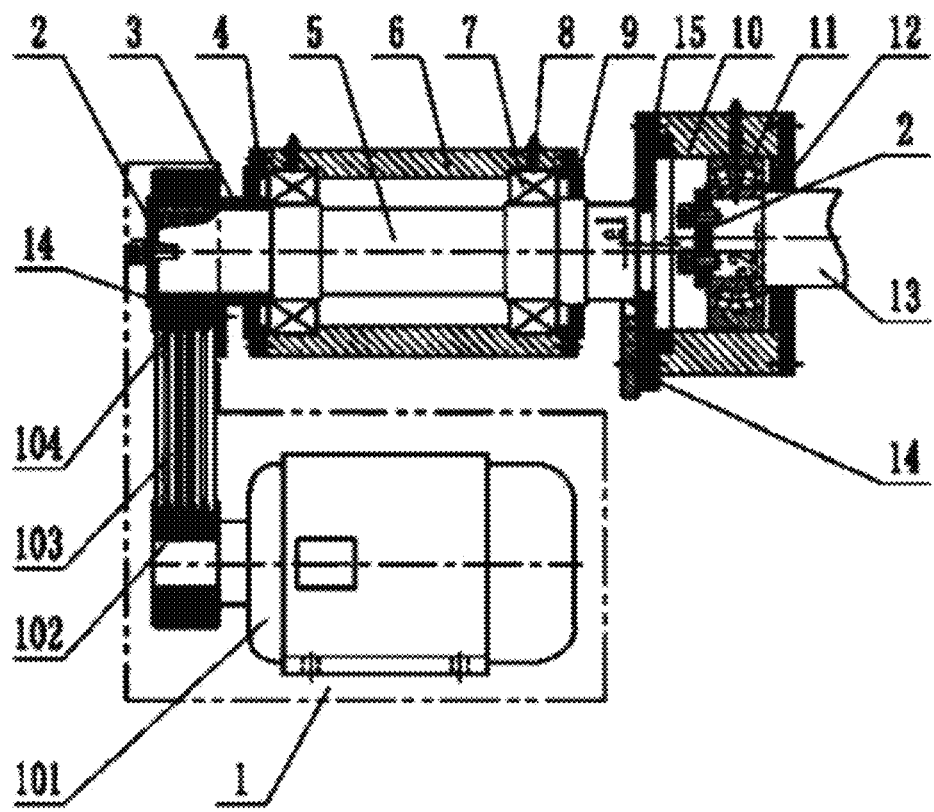
Figure 43:
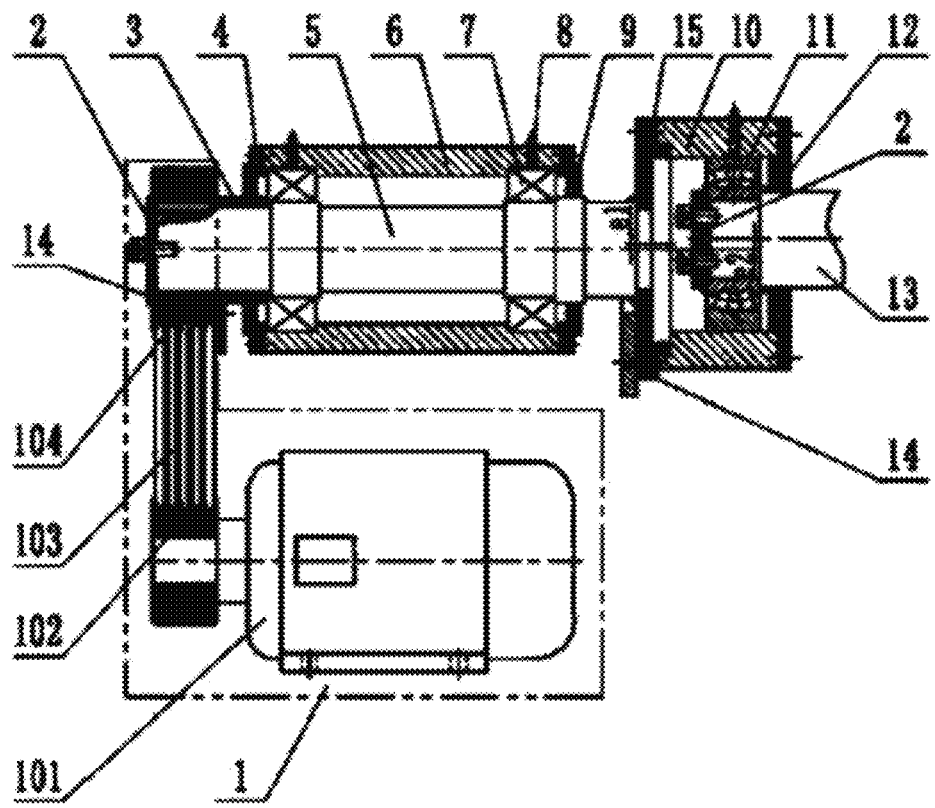
Figure 44:
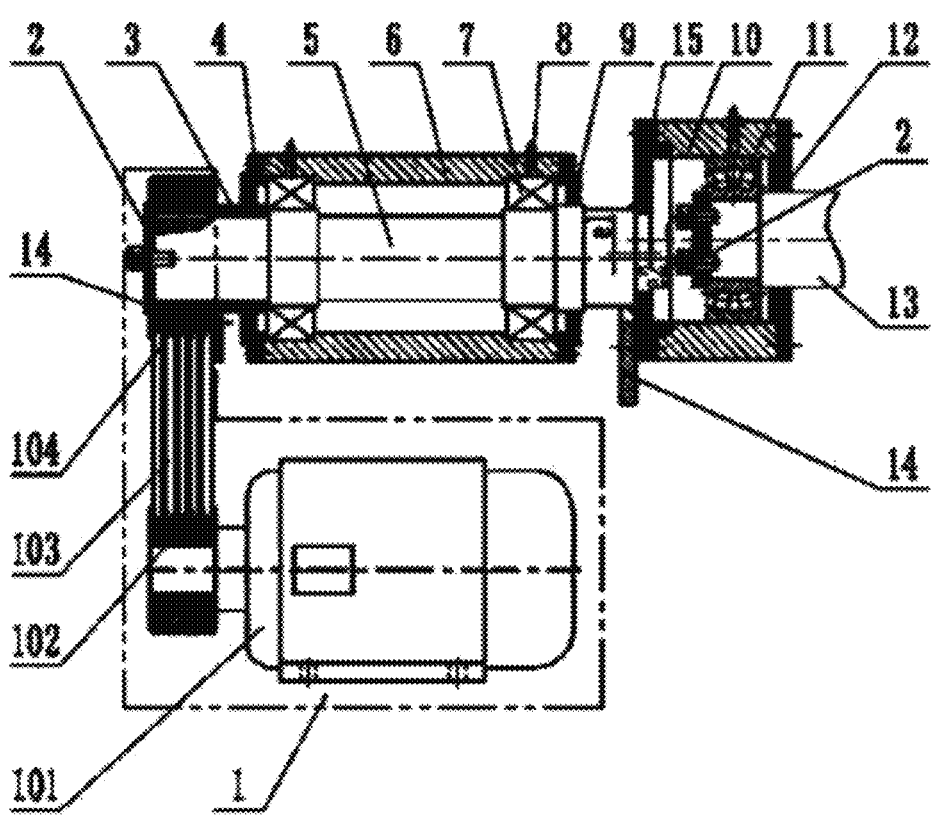
Figure 45:
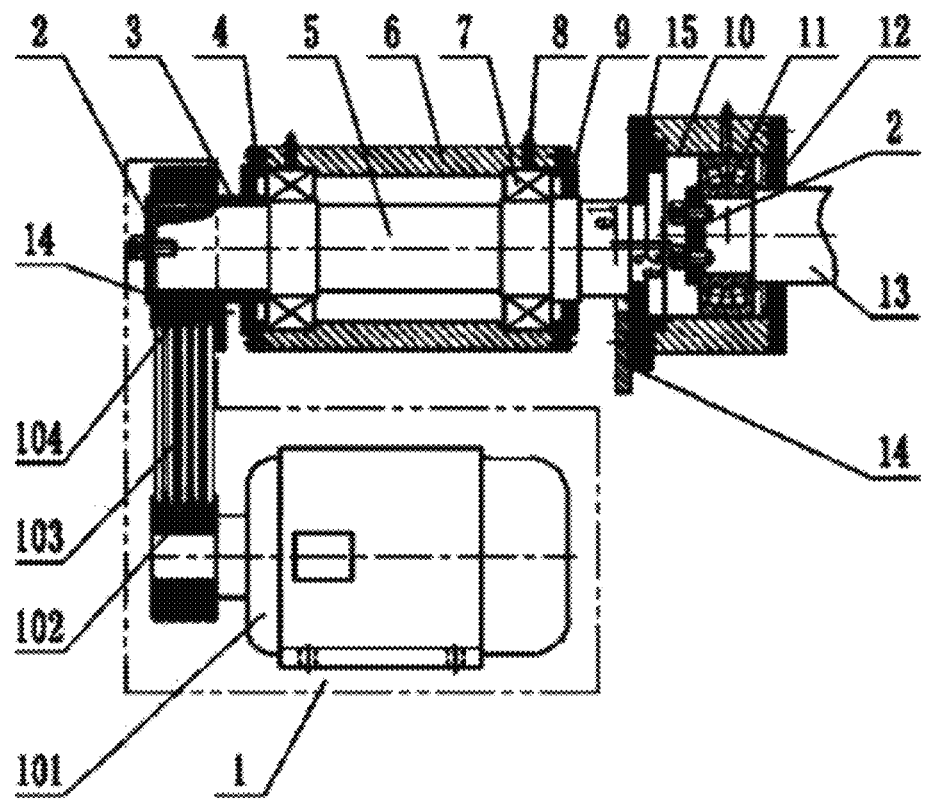
Figure 46:
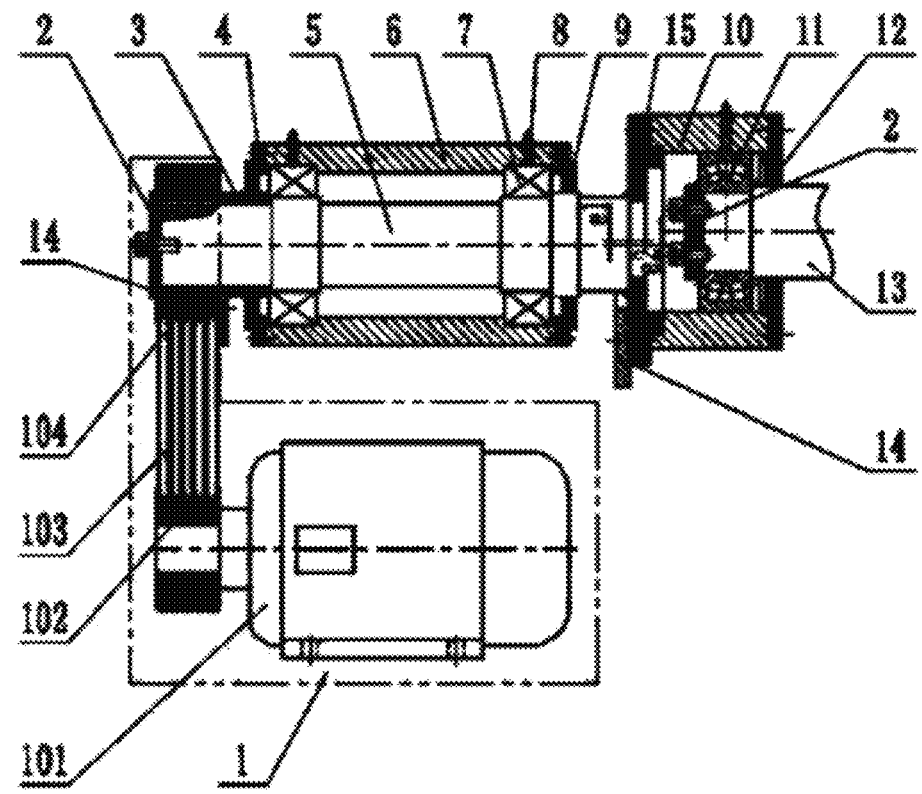
Figure 47:
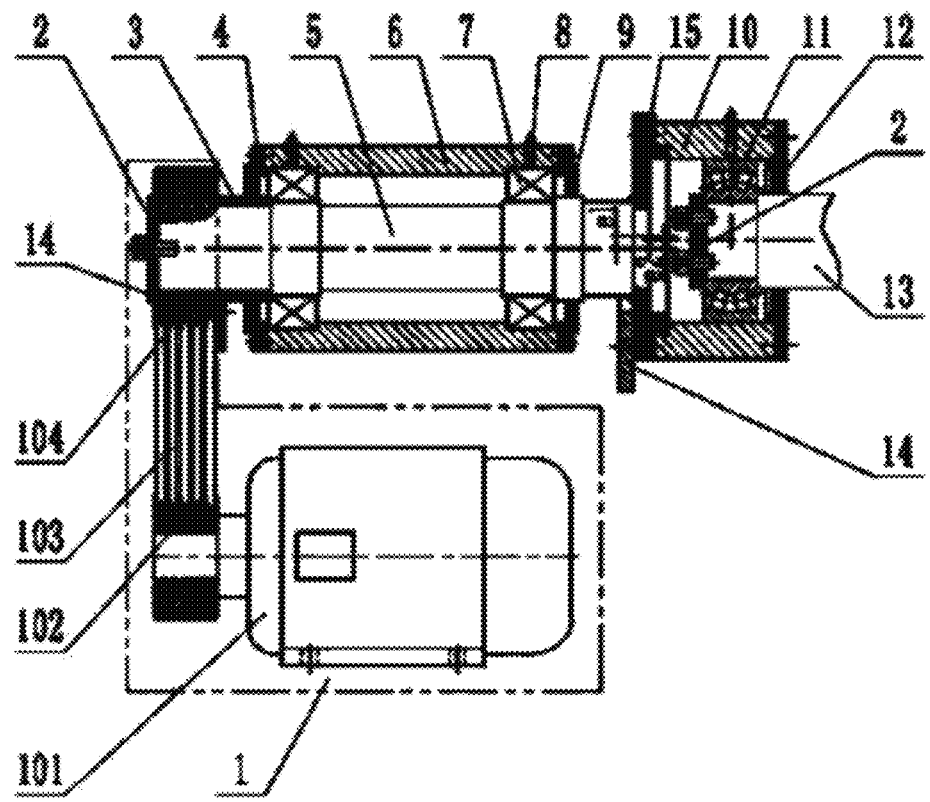
Figure 48:
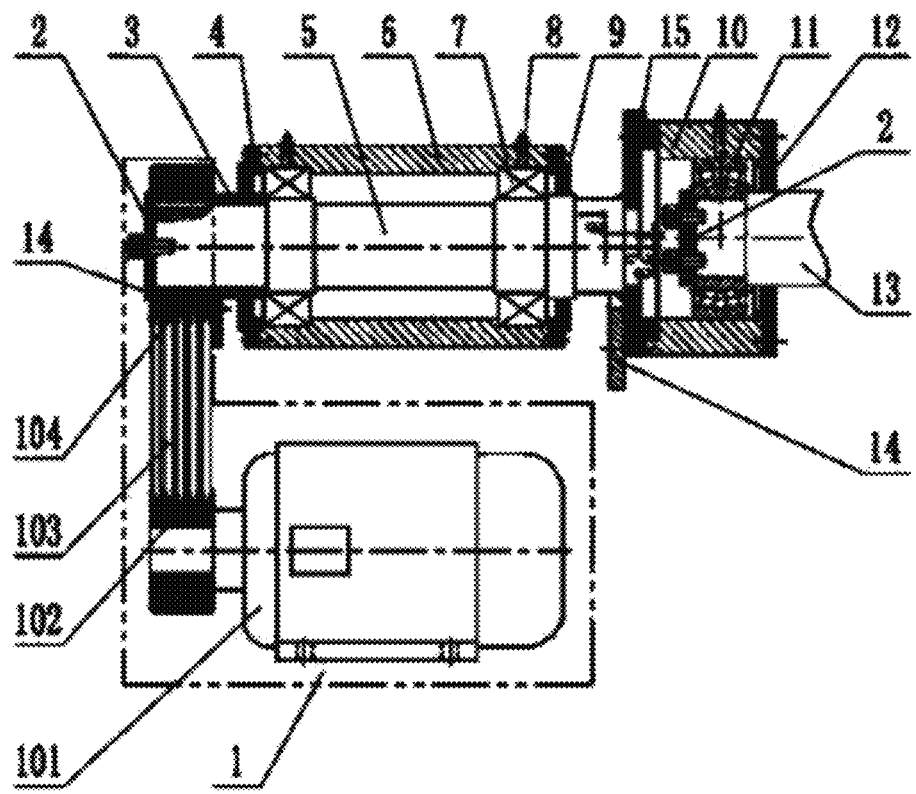
Figure 49:
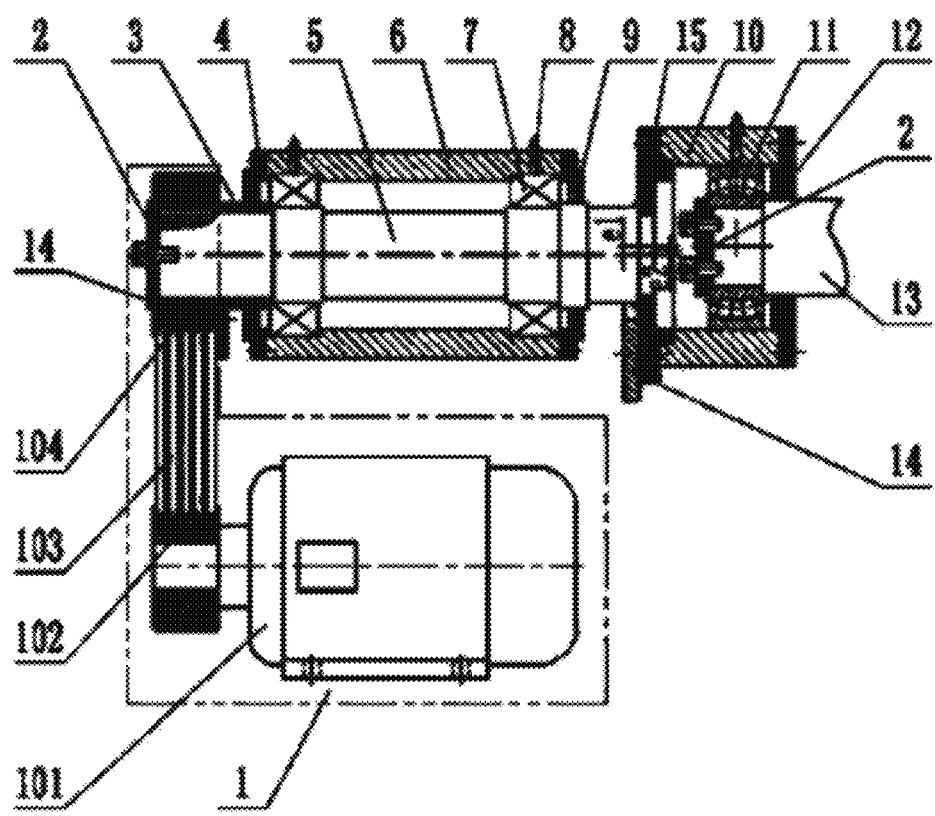

In the figures: 1. vibration transmission device; 101. motor; 102. driving pulley; 103. belt; 104. driven pulley; 2. shaft end retaining ring; 3. positioning sleeve; 4. bearing end cover; 5. transmission shaft; 6. first bearing housing; 7. first bearing; 8. lubricating oil passage; 9. sealing ring; 10. second bearing housing; 11. second bearing; 12. dust cover; 13. mixing shaft; 14. balance weight; 15. flange; 16. eccentric sleeve.

DETAILED DESCRIPTION OF THE EMBODIMENTS

The present disclosure will be further described below with reference to the accompanying drawings and specific embodiments.

Embodiment 1

A vibration device for a mixing machine includes a vibration transmission device 1, a transmission shaft 5, first bearings 7, a first bearing housing 6, a second bearing 11, a second bearing housing 10, and a mixing shaft 13. The transmission shaft 5 is a stepped shaft and is arranged so as to pass through the first bearing housing 6, and is supported and mounted in the first bearing housing 6 through the two first bearings 7. The two ends of the first bearing housing 6 are provided with bearing end covers 4, respectively. The first bearing housing 6 is provided with two lubricating oil passages 8. The lubricating oil passages 8 communicate with oil passages in the outer rings of the first bearings 7 for lubricating the first bearings 7, respectively. The power source of the vibration transmission device 1 is a motor 101. A driving pulley 102 is mounted on the output shaft of the motor 101. A driven pulley 104 is mounted at one end of the transmission shaft 5. A shaft end retaining ring 2 is arranged at an end portion of the driven pulley 104. A positioning sleeve 3 is arranged between the driven pulley 104 and the first bearing 7. The driving pulley 102 and the driven pulley 104 are drivingly connected by a belt 103, and the transmission shaft 5 operates at a rotational speed of 1,500 rpm. The other end of the transmission shaft 5 is structurally integrated with the second bearing housing 10. The second bearing housing 10 is rotatably connected to a shaft head at one end of the mixing shaft 13 by means of the second bearing 11. The shaft head at one end of the mixing shaft 13 is provided with a shaft shoulder and a shaft end retaining ring 2. The second bearing 11 is axially positioned by means of the shaft shoulder and the shaft end retaining ring 2 provided on the shaft head of the mixing shaft 13. The outer cylindrical surface of the outer ring of the second bearing 11 is fitted and connected to the corresponding inner hole of the second bearing housing 10, and the inner hole of the inner ring of the second bearing 11 is fitted and connected to the corresponding outer cylindrical surface of the shaft head at one end of the mixing shaft 13, so that the transmission shaft 5 and the mixing shaft 13 are rotated independently of each other. The other end of the second bearing housing 10 is provided with a dust cover 12. Both the bearing end cover 4 and the dust cover 12 are provided with sealing rings 9 to prevent leakage of lubricating oil from the first bearing housing 6 and from the second bearing housing 10 on the one hand and to prevent entry of dust from outside on the other hand. The inner hole of the second bearing housing 10 in which the second bearing 11 is mounted is machined and formed eccentrically relative to the rotational centerline of the transmission shaft 5, with an eccentricity e=1 mm. Therefore, upon assembly, the rotational centerline of the transmission shaft 5 is arranged so as to be offset from an axis of an outer raceway of the second bearing 11, where the axis of the outer raceway of the second bearing 11 specifically refers to a centerline of the outer raceway of the second bearing 11 along the axial direction of the transmission shaft 5.

In operation, the first bearings 7 and the second bearing 11 are lubricated in advance by means of the lubricating oil passages 8. The first bearing housing 6 is fixed to the frame of the mixing machine. The motor 101 is started, so that the driving pulley 102 and the belt 103 drive the transmission shaft 5 equipped with the driven pulley 104 to rotate at a high speed, which in turn drives the second bearing housing 10 provided with an eccentric inner hole to rotate at a high speed. Then, a periodic vibration at high frequency and low amplitude is transmitted from the second bearing 11 to the end head at one end of the mixing shaft 13, thereby driving the vibration of the entire mixing device. Moreover, balance weights 14 are provided at both an end surface of the second bearing housing 10 and an end surface of the driven pulley 104 to effectively reduce the undesirable vibration transmitted to the frame and to the transmission system. In this way, vibration energy is utilized at an increased rate, and the effective vibration effect is enhanced.

Embodiment 2

This embodiment is difference from Embodiment 1 in that an eccentric sleeve 16 is arranged between the second bearing housing 10 and the outer ring of the second bearing 11. The eccentric sleeve 16 may be a component such as a sleeve with multiple shaft segments. An inner hole of the eccentric sleeve 16 with a single shaft segment in which the second bearing 11 is mounted preferably has a centerline arranged eccentrically relative to the rotational centerline of the transmission shaft 5, so that the rotational centerline of the transmission shaft 5 is arranged so as to be offset from the axis of the outer raceway of the second bearing 11.

Embodiment 3

This embodiment is different from Embodiment 1 in that the second bearing 11 is a bearing with an eccentric outer ring. The bearing with an eccentric outer ring refers to a bearing comprising an outer ring having an outer cylindrical surface with a centerline eccentric to an axis of an outer raceway. The axis of the outer raceway refers to a centerline of the outer raceway along the axial direction of the transmission shaft 5. In this way, the rotational centerline of the transmission shaft 5 is arranged so as to be offset from the axis of the outer raceway of the second bearing 11.

Embodiment 4

This embodiment is different from Embodiment 1 in that an eccentric sleeve 16 is arranged between the second bearing housing 10 and the outer ring of the second bearing 11. As mentioned above, the inner hole of the eccentric sleeve 16 with a single shaft segment in which the second bearing 11 is mounted preferably has a centerline arranged eccentrically relative to the rotational centerline of the transmission shaft 5, and the inner hole of the second bearing housing 10 in which the second bearing 11 is mounted is machined and formed eccentrically relative to the rotational centerline of the transmission shaft 5, so that the rotational centerline of the transmission shaft 5 is arranged so as to be offset from the axis of the outer raceway of the second bearing 11.

Embodiment 5

This embodiment is different from Embodiment 1 in that the second bearing 11 is a bearing with an eccentric outer ring, and the inner hole of the second bearing housing 10 in which the second bearing 11 is mounted is machined and formed eccentrically relative to the rotational centerline of the transmission shaft 5. In this way, the rotational centerline of the transmission shaft 5 is arranged so as to be offset from the axis of the outer raceway of the second bearing 11.

Embodiment 6

This embodiment is different from Embodiment 1 in that an eccentric sleeve 16 is arranged between the second bearing housing 10 and the outer ring of the second bearing 11. As mentioned above, the inner hole of the eccentric sleeve 16 with a single shaft segment in which the second bearing 11 is mounted preferably has a centerline arranged eccentrically relative to the rotational centerline of the transmission shaft 5, and the second bearing 11 is a bearing with an eccentric outer ring, so that the rotational centerline of the transmission shaft 5 is arranged so as to be offset from the axis of the outer raceway of the second bearing 11.

Embodiment 7

This embodiment is different from Embodiment 1 in that the transmission shaft 5 and the second bearing housing 10 are fitted by means of seam allowances and then welded to each other. The inner hole of the second bearing housing 10 in which the second bearing 11 is mounted is machined and formed eccentrically relative to the rotational centerline of the transmission shaft 5, so that the rotational centerline of the transmission shaft 5 is arranged so as to be offset from the axis of the outer raceway of the second bearing 11.

Embodiment 8

This embodiment is different from Embodiment 7 in that an eccentric sleeve 16 is arranged between the second bearing housing 10 and the outer ring of the second bearing 11. As mentioned above, the inner hole of the eccentric sleeve 16 with a single shaft segment in which the second bearing 11 is mounted preferably has a centerline arranged eccentrically relative to the rotational centerline of the transmission shaft 5, so that the rotational centerline of the transmission shaft 5 is arranged so as to be offset from the axis of the outer raceway of the second bearing 11.

Embodiment 9

This embodiment is different from Embodiment 7 in that the second bearing 11 is a bearing with an eccentric outer ring. In this way, the rotational centerline of the transmission shaft 5 is arranged so as to be offset from the axis of the outer raceway of the second bearing 11.

Embodiment 10

This embodiment is different from Embodiment 7 in that the seam allowances of the transmission shaft 5 and the second bearing housing 10 may be reversed with each other. The outer cylindrical surface of the convex seam allowance of the transmission shaft 5 preferably has a centerline arranged eccentrically relative to the rotational centerline of the transmission shaft 5, so that the rotational centerline of the transmission shaft 5 is arranged so as to be offset from the axis of the outer raceway of the second bearing 11.

Embodiment 11

This embodiment is different from Embodiment 7 in that the inner hole of the concave seam allowance of the second bearing housing 10 is preferably arranged eccentrically relative to the outer cylindrical surface of the second bearing housing 10 as mentioned above. In this way, the rotational centerline of the transmission shaft 5 is arranged so as to be offset from the axis of the outer raceway of the second bearing 11.

Embodiment 12

This embodiment is different from Embodiment 7 in that an eccentric sleeve 16 is arranged between the second bearing housing 10 and the outer ring of the second bearing 11. As mentioned above, the inner hole of the eccentric sleeve 16 with a single shaft segment in which the second bearing 11 is mounted preferably has a centerline arranged eccentrically relative to the rotational centerline of the transmission shaft 5, and the inner hole of the second bearing housing 10 in which the second bearing 11 is mounted is machined and formed eccentrically relative to the rotational centerline of the transmission shaft 5, so that the rotational centerline of the transmission shaft 5 is arranged so as to be offset from the axis of the outer raceway of the second bearing 11.

Embodiment 13

This embodiment is different from Embodiment 7 in that the second bearing 11 is a bearing with an eccentric outer ring, and the inner hole of the second bearing housing 10 in which the second bearing 11 is mounted is machined and formed eccentrically relative to the rotational centerline of the transmission shaft 5. In this way, the rotational centerline of the transmission shaft 5 is arranged so as to be offset from the axis of the outer raceway of the second bearing 11.

Embodiment 14

This embodiment is different from Embodiment 7 in that the inner hole of the second bearing housing 10 in which the second bearing 11 is mounted is machined and formed eccentrically relative to the rotational centerline of the transmission shaft 5, and the outer cylindrical surface of the convex seam allowance of the transmission shaft 5 preferably has a centerline arranged eccentrically relative to the rotational centerline of the transmission shaft 5. In this way, the rotational centerline of the transmission shaft 5 is arranged so as to be offset from the axis of the outer raceway of the second bearing 11.

Embodiment 15

This embodiment is different from Embodiment 7 in that the inner hole of the second bearing housing 10 in which the second bearing 11 is mounted is machined and formed eccentrically relative to the rotational centerline of the transmission shaft 5, and the inner hole of the concave seam allowance of the second bearing housing 10 is preferably arranged eccentrically relative to the outer cylindrical surface of the second bearing housing 10. In this way, the rotational centerline of the transmission shaft 5 is arranged so as to be offset from the axis of the outer raceway of the second bearing 11.

Embodiment 16

This embodiment is different from Embodiment 7 in that an eccentric sleeve 16 is arranged between the second bearing housing 10 and the outer ring of the second bearing 11. As mentioned above, the inner hole of the eccentric sleeve 16 with a single shaft segment in which the second bearing 11 is mounted preferably has a centerline arranged eccentrically relative to the rotational centerline of the transmission shaft 5, and the second bearing 11 is a bearing with an eccentric outer ring, so that the rotational centerline of the transmission shaft 5 is arranged so as to be offset from the axis of the outer raceway of the second bearing 11.

Embodiment 17

This embodiment is different from Embodiment 7 in that an eccentric sleeve 16 is arranged between the second bearing housing 10 and the outer ring of the second bearing 11. As mentioned above, the inner hole of the eccentric sleeve 16 with a single shaft segment in which the second bearing 11 is mounted preferably has a centerline arranged eccentrically relative to the rotational centerline of the transmission shaft 5, and the outer cylindrical surface of the convex seam allowance of the transmission shaft 5 preferably has a centerline arranged eccentrically relative to the rotational centerline of the transmission shaft 5, so that the rotational centerline of the transmission shaft 5 is arranged so as to be offset from the axis of the outer raceway of the second bearing 11.

Embodiment 18

This embodiment is different from Embodiment 7 in that an eccentric sleeve 16 is arranged between the second bearing housing 10 and the outer ring of the second bearing 11. As mentioned above, the inner hole of the eccentric sleeve 16 with a single shaft segment in which the second bearing 11 is mounted preferably has a centerline arranged eccentrically relative to the rotational centerline of the transmission shaft 5, and the inner hole of the concave seam allowance of the second bearing housing 10 is preferably arranged eccentrically relative to the outer cylindrical surface of the second bearing housing 10, so that the rotational centerline of the transmission shaft 5 is arranged so as to be offset from the axis of the outer raceway of the second bearing 11.

Embodiment 19

This embodiment is different from Embodiment 7 in that the second bearing 11 is a bearing with an eccentric outer ring, and the outer cylindrical surface of the convex seam allowance of the transmission shaft 5 preferably has a centerline arranged eccentrically relative to the rotational centerline of the transmission shaft 5. In this way, the rotational centerline of the transmission shaft 5 is arranged so as to be offset from the axis of the outer raceway of the second bearing 11.

Embodiment 20

This embodiment is different from Embodiment 7 in that the second bearing 11 is a bearing with an eccentric outer ring, and the inner hole of the concave seam allowance of the second bearing housing 10 is preferably arranged eccentrically relative to the outer cylindrical surface of the second bearing housing 10. In this way, the rotational centerline of the transmission shaft 5 is arranged so as to be offset from the axis of the outer raceway of the second bearing 11.

Embodiment 21

This embodiment is different from Embodiment 7 in that the outer cylindrical surface of the convex seam allowance of the transmission shaft 5 preferably has a centerline arranged eccentrically relative to the rotational centerline of the transmission shaft 5, and the inner hole of the concave seam allowance of the second bearing housing 10 is arranged eccentrically relative to the outer cylindrical surface of the second bearing housing 10. In this way, the rotational centerline of the transmission shaft 5 is arranged so as to be offset from the axis of the outer raceway of the second bearing 11.

Embodiment 22

This embodiment is different from Embodiment 1 in that a flange 15 is arranged between the transmission shaft 5 and the second bearing housing 10. The two ends of the flange 15 are fitted with the transmission shaft 5 and the second bearing housing 10 by means of seam allowances, respectively, and it is preferable that the flange 15 is fitted by means of a concave seam allowance and then welded on its side close to the transmission shaft 5, and the flange 5 is fitted by means of a convex seam allowance and then connected by means of bolts on its side close to the second bearing housing 10. The inner hole of the second bearing housing 10 in which the second bearing 11 is mounted is machined and formed eccentrically relative to the rotational centerline of the transmission shaft 5, so that the rotational centerline of the transmission shaft 5 is arranged so as to be offset from the axis of the outer raceway of the second bearing 11.

Embodiment 23

This embodiment is different from Embodiment 22 in that an eccentric sleeve 16 is arranged between the second bearing housing 10 and the outer ring of the second bearing 11. As mentioned above, the inner hole of the eccentric sleeve 16 with a single shaft segment in which the second bearing 11 is mounted preferably has a centerline arranged eccentrically relative to the rotational centerline of the transmission shaft 5, so that the rotational centerline of the transmission shaft 5 is arranged so as to be offset from the axis of the outer raceway of the second bearing 11.

Embodiment 24

This embodiment is different from Embodiment 22 in that the second bearing 11 is a bearing with an eccentric outer ring. In this way, the rotational centerline of the transmission shaft 5 is arranged so as to be offset from the axis of the outer raceway of the second bearing 11.

Embodiment 25

This embodiment is different from Embodiment 22 in that the outer cylindrical surface of the convex seam allowance of the transmission shaft 5 preferably has a centerline arranged eccentrically relative to the rotational centerline of the transmission shaft 5. In this way, the rotational centerline of the transmission shaft 5 is arranged so as to be offset from the axis of the outer raceway of the second bearing 11.

Embodiment 26

This embodiment is different from Embodiment 22 in that the concave seam allowance on the side of the flange 15 close to the transmission shaft 5 preferably has an inner hole arranged eccentrically relative to the outer cylindrical surface of the flange 15. In this way, the rotational centerline of the transmission shaft 5 is arranged so as to be offset from the axis of the outer raceway of the second bearing 11.

Embodiment 27

This embodiment is different from Embodiment 22 in that the outer cylindrical surface of the convex seam allowance on the side of the flange 15 close to the second bearing housing 10 preferably has a centerline arranged eccentrically relative to the rotational centerline of the transmission shaft 5. In this way, the rotational centerline of the transmission shaft 5 is arranged so as to be offset from the axis of the outer raceway of the second bearing 11.

Embodiment 28

This embodiment is different from Embodiment 22 in that the concave seam allowance on a side of the second bearing housing 10 preferably has an inner hole arranged eccentrically relative to the outer cylindrical surface of the second bearing housing 10. In this way, the rotational centerline of the transmission shaft 5 is arranged so as to be offset from the axis of the outer raceway of the second bearing 11.

Embodiment 29

This embodiment is different from Embodiment 22 in that an eccentric sleeve 16 is arranged between the second bearing housing 10 and the outer ring of the second bearing 11. As mentioned above, the inner hole of the eccentric sleeve 16 with a single shaft segment in which the second bearing 11 is mounted preferably has a centerline arranged eccentrically relative to the rotational centerline of the transmission shaft 5, and the inner hole of the second bearing housing 10 in which the second bearing 11 is mounted is machined and formed eccentrically relative to the rotational centerline of the transmission shaft 5, so that the rotational centerline of the transmission shaft 5 is arranged so as to be offset from the axis of the outer raceway of the second bearing 11.

Embodiment 30

This embodiment is different from Embodiment 22 in that the inner hole of the second bearing housing 10 in which the second bearing 11 is mounted is machined and formed eccentrically relative to the rotational centerline of the transmission shaft 5, and the second bearing 11 is a bearing with an eccentric outer ring. In this way, the rotational centerline of the transmission shaft 5 is arranged so as to be offset from the axis of the outer raceway of the second bearing 11.

Embodiment 31

This embodiment is different from Embodiment 22 in that the inner hole of the second bearing housing 10 in which the second bearing 11 is mounted is machined and formed eccentrically relative to the rotational centerline of the transmission shaft 5, and the outer cylindrical surface of the convex seam allowance of the transmission shaft 5 preferably has a centerline arranged eccentrically relative to the rotational centerline of the transmission shaft 5. In this way, the rotational centerline of the transmission shaft 5 is arranged so as to be offset from the axis of the outer raceway of the second bearing 11.

Embodiment 32

This embodiment is different from Embodiment 22 in that the inner hole of the second bearing housing 10 in which the second bearing 11 is mounted is machined and formed eccentrically relative to the rotational centerline of the transmission shaft 5, and the concave seam allowance on the side of the flange 15 close to the transmission shaft 5 preferably has an inner hole arranged eccentrically relative to the outer cylindrical surface of the flange 15. In this way, the rotational centerline of the transmission shaft 5 is arranged so as to be offset from the axis of the outer raceway of the second bearing 11.

Embodiment 33

This embodiment is different from Embodiment 22 in that the inner hole of the second bearing housing 10 in which the second bearing 11 is mounted is machined and formed eccentrically relative to the rotational centerline of the transmission shaft 5, and the convex seam allowance on the side of the flange 15 close to the second bearing housing 10 preferably has an outer cylindrical surface arranged eccentrically relative to the outer cylindrical surface of the flange 15. In this way, the rotational centerline of the transmission shaft 5 is arranged so as to be offset from the axis of the outer raceway of the second bearing 11.

Embodiment 34

This embodiment is different from Embodiment 22 in that the inner hole of the second bearing housing 10 in which the second bearing 11 is mounted is machined and formed eccentrically relative to the rotational centerline of the transmission shaft 5, and the concave seam allowance on a side of the second bearing housing 10 preferably has an inner hole arranged eccentrically relative to the outer cylindrical surface of the second bearing housing 10. In this way, the rotational centerline of the transmission shaft 5 is arranged so as to be offset from the axis of the outer raceway of the second bearing 11.

Embodiment 35

This embodiment is different from Embodiment 22 in that an eccentric sleeve 16 is arranged between the second bearing housing 10 and the outer ring of the second bearing 11. As mentioned above, the inner hole of the eccentric sleeve 16 with a single shaft segment in which the second bearing 11 is mounted preferably has a centerline arranged eccentrically relative to the rotational centerline of the transmission shaft 5, and the second bearing 11 is a bearing with an eccentric outer ring, so that the rotational centerline of the transmission shaft 5 is arranged so as to be offset from the axis of the outer raceway of the second bearing 11.

Embodiment 36

This embodiment is different from Embodiment 22 in that an eccentric sleeve 16 is arranged between the second bearing housing 10 and the outer ring of the second bearing 11. As mentioned above, the inner hole of the eccentric sleeve 16 with a single shaft segment in which the second bearing 11 is mounted preferably has a centerline arranged eccentrically relative to the rotational centerline of the transmission shaft 5, and the outer cylindrical surface of the convex seam allowance of the transmission shaft 5 preferably has a centerline arranged eccentrically relative to the rotational centerline of the transmission shaft 5, so that the rotational centerline of the transmission shaft 5 is arranged so as to be offset from the axis of the outer raceway of the second bearing 11.

Embodiment 37

This embodiment is different from Embodiment 22 in that an eccentric sleeve 16 is arranged between the second bearing housing 10 and the outer ring of the second bearing 11. As mentioned above, the inner hole of the eccentric sleeve 16 with a single shaft segment in which the second bearing 11 is mounted preferably has a centerline arranged eccentrically relative to the rotational centerline of the transmission shaft 5, and the concave seam allowance on the side of the flange 15 close to the transmission shaft 5 preferably has an inner hole arranged eccentrically relative to the outer cylindrical surface of the flange 15, so that the rotational centerline of the transmission shaft 5 is arranged so as to be offset from the axis of the outer raceway of the second bearing 11.

Embodiment 38

This embodiment is different from Embodiment 22 in that an eccentric sleeve 16 is arranged between the second bearing housing 10 and the outer ring of the second bearing 11. As mentioned above, the inner hole of the eccentric sleeve 16 with a single shaft segment in which the second bearing 11 is mounted preferably has a centerline arranged eccentrically relative to the rotational centerline of the transmission shaft 5, and the convex seam allowance on the side of the flange 15 close to the second bearing housing 10 preferably has an outer cylindrical surface arranged eccentrically relative to the outer cylindrical surface of the flange 15, so that the rotational centerline of the transmission shaft 5 is arranged so as to be offset from the axis of the outer raceway of the second bearing 11.

Embodiment 39

This embodiment is different from Embodiment 22 in that an eccentric sleeve 16 is arranged between the second bearing housing 10 and the outer ring of the second bearing 11. As mentioned above, the inner hole of the eccentric sleeve 16 with a single shaft segment in which the second bearing 11 is mounted preferably has a centerline arranged eccentrically relative to the rotational centerline of the transmission shaft 5, and the concave seam allowance on a side of the second bearing housing 10 preferably has an inner hole arranged eccentrically relative to the outer cylindrical surface of the second bearing housing 10, so that the rotational centerline of the transmission shaft 5 is arranged so as to be offset from the axis of the outer raceway of the second bearing 11.

Embodiment 40

This embodiment is different from Embodiment 22 in that the second bearing 11 is a bearing with an eccentric outer ring, and the outer cylindrical surface of the convex seam allowance of the transmission shaft 5 has a centerline arranged eccentrically relative to the rotational centerline of the transmission shaft 5. In this way, the rotational centerline of the transmission shaft 5 is arranged so as to be offset from the axis of the outer raceway of the second bearing 11.

Embodiment 41

This embodiment is different from Embodiment 22 in that the second bearing 11 is a bearing with an eccentric outer ring, and the concave seam allowance on the side of the flange 15 close to the transmission shaft 5 preferably has an inner hole arranged eccentrically relative to the outer cylindrical surface of the flange 15. In this way, the rotational centerline of the transmission shaft 5 is arranged so as to be offset from the axis of the outer raceway of the second bearing 11.

Embodiment 42

This embodiment is different from Embodiment 22 in that the second bearing 11 is a bearing with an eccentric outer ring, and the outer cylindrical surface of the convex seam allowance on the side of the flange 15 close to the second bearing housing 10 preferably has a centerline arranged eccentrically relative to the rotational centerline of the transmission shaft 5. In this way, the rotational centerline of the transmission shaft 5 is arranged so as to be offset from the axis of the outer raceway of the second bearing 11.

Embodiment 43

This embodiment is different from Embodiment 22 in that the second bearing 11 is a bearing with an eccentric outer ring, and the concave seam allowance on a side of the second bearing housing 10 preferably has an inner hole arranged eccentrically relative to the outer cylindrical surface of the second bearing housing 10. In this way, the rotational centerline of the transmission shaft 5 is arranged so as to be offset from the axis of the outer raceway of the second bearing 11.

Embodiment 44

This embodiment is different from Embodiment 22 in that the outer cylindrical surface of the convex seam allowance of the transmission shaft 5 preferably has a centerline arranged eccentrically relative to the rotational centerline of the transmission shaft 5, and the concave seam allowance on the side of the flange 15 close to the transmission shaft 5 preferably has an inner hole arranged eccentrically relative to the outer cylindrical surface of the flange 15. In this way, the rotational centerline of the transmission shaft 5 is arranged so as to be offset from the axis of the outer raceway of the second bearing 11.

Embodiment 45

This embodiment is different from Embodiment 22 in that the outer cylindrical surface of the convex seam allowance of the transmission shaft 5 preferably has a centerline arranged eccentrically relative to the rotational centerline of the transmission shaft 5, and the outer cylindrical surface of the convex seam allowance on the side of the flange 15 close to the second bearing housing 10 preferably has a centerline arranged eccentrically relative to the rotational centerline of the transmission shaft 5. In this way, the rotational centerline of the transmission shaft 5 is arranged so as to be offset from the axis of the outer raceway of the second bearing 11.

Embodiment 46

This embodiment is different from Embodiment 22 in that the outer cylindrical surface of the convex seam allowance of the transmission shaft 5 preferably has a centerline arranged eccentrically relative to the rotational centerline of the transmission shaft 5, and the concave seam allowance on a side of the second bearing housing 10 preferably has an inner hole arranged eccentrically relative to the outer cylindrical surface of the second bearing housing 10. In this way, the rotational centerline of the transmission shaft 5 is arranged so as to be offset from the axis of the outer raceway of the second bearing 11.

Embodiment 47

This embodiment is different from Embodiment 22 in that the concave seam allowance on the side of the flange 15 close to the transmission shaft 5 preferably has an inner hole arranged eccentrically relative to the outer cylindrical surface of the flange 15, and the outer cylindrical surface of the convex seam allowance on the side of the flange 15 close to the second bearing housing 10 preferably has a centerline arranged eccentrically relative to the rotational centerline of the transmission shaft 5. In this way, the rotational centerline of the transmission shaft 5 is arranged so as to be offset from the axis of the outer raceway of the second bearing 11.

Embodiment 48

This embodiment is different from Embodiment 22 in that the concave seam allowance on the side of the flange 15 close to the transmission shaft 5 preferably has an inner hole arranged eccentrically relative to the outer cylindrical surface of the flange 15, and the concave seam allowance on a side of the second bearing housing 10 preferably has an inner hole arranged eccentrically relative to the outer cylindrical surface of the second bearing housing 10. In this way, the rotational centerline of the transmission shaft 5 is arranged so as to be offset from the axis of the outer raceway of the second bearing 11.

Embodiment 49

This embodiment is different from Embodiment 22 in that the outer cylindrical surface of the convex seam allowance on the side of the flange 15 close to the second bearing housing 10 preferably has a centerline arranged eccentrically relative to the rotational centerline of the transmission shaft 5, and the concave seam allowance on a side of the second bearing housing 10 preferably has an inner hole arranged eccentrically relative to the outer cylindrical surface of the second bearing housing 10. In this way, the rotational centerline of the transmission shaft 5 is arranged so as to be offset from the axis of the outer raceway of the second bearing 11.

In any combination of two of the eccentric solutions of all the above embodiments, the rotational centerline of the transmission shaft 5 should be finally arranged so as to be offset from the axis of the outer raceway of the second bearing 11, with a total offset being equal to a vector sum of the respective eccentricities. As can be seen from the above specific embodiments, a vibration device for a mixing machine according to the present disclosure is characterized by being implemented in flexible and diverse eccentric modes and having a simple overall structure, a good vibration effect, and high reliability.

The above description is merely illustrative of preferred embodiments of the present disclosure and is not intended to limit the present disclosure, although combinations of any three or more of the above-mentioned eccentric solutions are not further described. Any modifications, equivalent alternatives, improvements and so on made within the spirit and principle of the present disclosure are intended to be encompassed within the scope of protection of the present disclosure.

What is claimed is:

1. A vibration device for a mixing machine, comprising: a vibration transmission device, a transmission shaft, first bearings, a first bearing housing, a second bearing having an outer ring, a second bearing housing, a mixing shaft, wherein the transmission shaft is arranged so as to pass through the first bearing housing and is supported in the first bearing housing through at least two first bearings, one end of the transmission shaft is connected to the vibration transmission device, the other end of the transmission shaft is fixedly connected to the second bearing housing, the second bearing housing is connected to a shaft head at one end of the mixing shaft by means of the second bearing, and a rotational centerline of the transmission shaft is arranged so as to be offset from an axis of an outer raceway of the second bearing, and an eccentric sleeve arranged between the second bearing housing and the outer ring of the second bearing.

2. The vibration device for a mixing machine according to claim 1, wherein the transmission shaft and the second bearing housing are fitted with each other by means of seam allowances, wherein the transmission shaft has an end portion formed as a convex seam allowance, and the second bearing housing has an end portion formed as a concave seam allowance.

3. The vibration device for a mixing machine according to claim 2, wherein the convex seam allowance of the transmission shaft has an outer cylindrical surface arranged eccentrically.

4. The vibration device for a mixing machine according to claim 2, wherein the concave seam allowance of the second bearing housing has an inner hole arranged eccentrically.

5. The vibration device for a mixing machine according to claim 2, wherein the convex seam allowance of the transmission shaft has an outer cylindrical surface arranged eccentrically, and the concave seam allowance of the second bearing housing has an inner hole arranged eccentrically.

6. The vibration device for a mixing machine according to claim 3, wherein the second bearing housing has an eccentrically arranged inner hole, in which the second bearing is mounted.

7. The vibration device for a mixing machine according to claim 1, wherein a flange is arranged between the transmission shaft and the second bearing housing, wherein the flange has two ends fitted with the transmission shaft and the second bearing housing by means of seam allowances, respectively, wherein a concave seam allowance is provided on a side of the flange close to the transmission shaft, and a convex seam allowance is provided on a side of the flange close to the second bearing housing.

8. The vibration device for a mixing machine according to claim 7, wherein the transmission shaft has a convex seam allowance with an outer cylindrical surface arranged eccentrically.

9. The vibration device for a mixing machine according to claim 7, wherein the concave seam allowance of the flange has an inner hole arranged eccentrically.

10. The vibration device for a mixing machine according to claim 7, wherein the convex seam allowance of the flange has an outer cylindrical surface arranged eccentrically.

11. The vibration device for a mixing machine according to claim 7, wherein the second bearing housing has a concave seam allowance with an inner hole arranged eccentrically.

12. The vibration device for a mixing machine according to claim 7, wherein the transmission shaft has a convex seam allowance with an outer cylindrical surface arranged eccentrically, and the concave seam allowance of the flange has an inner hole arranged eccentrically.

13. The vibration device for a mixing machine according to claim 7, wherein the convex seam allowance of the flange has an outer cylindrical surface arranged eccentrically, and the second bearing housing has a concave seam allowance with an inner hole arranged eccentrically.

14. The vibration device for a mixing machine according to claim 1, wherein the second bearing housing has an eccentrically arranged inner hole, in which the second bearing is mounted.

15. The vibration device for a mixing machine according to claim 1, wherein the outer ring of the second bearing is an eccentric outer ring.

16. The vibration device for a mixing machine according to claim 1, wherein the second bearing housing has an eccentrically arranged inner hole, in which the eccentric sleeve is mounted.

17. The vibration device for a mixing machine according to claim 1, wherein the second bearing housing has an eccentrically arranged inner hole, in which the second bearing is mounted, and the outer ring of the second bearing is an eccentric outer ring.

18. The vibration device for a mixing machine according to claim 4, wherein the second bearing housing has an eccentrically arranged inner hole, in which the second bearing is mounted.

19. The vibration device for a mixing machine according to claim 7, wherein:

the second bearing housing has an eccentrically arranged inner hole, in which the second bearing and the eccentric sleeve are mounted; and the second bearing is a bearing with an eccentric outer ring.

20. The vibration device for a mixing machine according to claim 19, wherein the convex seam allowance of the flange has an outer cylindrical surface arranged eccentrically, and the second bearing housing has a concave seam allowance with an inner hole arranged eccentrically.

* * * * *